United States Patent [19]

Funatsu

[11] Patent Number: 5,478,673
[45] Date of Patent: Dec. 26, 1995

[54] NONAQUEOUS SECONDARY BATTERY

[75] Inventor: Eiji Funatsu, Kanagawa, Japan

[73] Assignee: Fuji Photo Film Co., Ltd., Kanagawa, Japan

[21] Appl. No.: 110,951

[22] Filed: Aug. 24, 1993

[30] Foreign Application Priority Data

Oct. 29, 1992 [JP] Japan ................................ 4-291686

[51] Int. Cl.⁶ .......................... H01M 10/40; H01M 4/48
[52] U.S. Cl. ........................................... 429/197; 429/218
[58] Field of Search ............................... 429/197, 194, 429/218

[56] References Cited

U.S. PATENT DOCUMENTS

| | | | |
|---|---|---|---|
| 4,820,599 | 4/1989 | Furukawa et al. | 429/194 |
| 4,957,833 | 9/1990 | Daifuku et al. | 429/197 |
| 5,030,528 | 7/1991 | Shen et al. | 429/218 X |
| 5,079,109 | 1/1992 | Takami et al. | 429/197 |
| 5,147,739 | 9/1992 | Beard . | |
| 5,192,629 | 3/1993 | Guyomard et al. | 429/197 |

FOREIGN PATENT DOCUMENTS

| | | |
|---|---|---|
| 0398689 | 11/1990 | European Pat. Off. . |
| 0482287 | 4/1992 | European Pat. Off. . |
| 0504678 | 9/1992 | European Pat. Off. . |
| 0567149 | 10/1993 | European Pat. Off. . |
| 0582173 | 2/1994 | European Pat. Off. . |
| 2589631 | 5/1987 | France . |

*Primary Examiner*—John S. Maples
*Attorney, Agent, or Firm*—Sughrue, Mion, Zinn, Macpeak & Seas

[57] ABSTRACT

A nonaqueous secondary battery comprises an anode active material, a cathode active material and an electrolytic solution. The anode active material comprises a transition metal oxide, and the electrolytic solution is prepared by dissolving a fluorine-containing lithium salt in a mixed solvent comprising ethylene carbonate and at least one selected from the group consisting of chain carbonic acid esters, cyclic carbonic acid esters, cyclic esters, chain ethers and cyclic ethers.

15 Claims, 2 Drawing Sheets

NONAQUEOUS SECONDARY BATTERY

FIELD OF THE INVENTION

This invention relates to a nonaqueous secondary battery having high discharge capacity, excellent characteristics in charge-discharge cycle and assured safety.

BACKGROUND OF THE INVENTION

A nonaqueous secondary battery basically comprises a cathode active material, an electrolytic solution and an anode active material comprising a lithium metal or a lithium alloy. In the secondary battery using lithium metal as the anode active material, highly active tree-like lithium metal (dendrite) or mossy lithium metal (moss) is apt to form on the anode during repetition of charging and discharging. When the dendrite or the moss peels off to become in contact with the cathode active material of the battery or when it grows to touch the cathode active material directly, an inner short circuit is produced within the battery.

Recently, as the battery using no lithium metal for an anode active material, proposed are some batteries using carbonaceous materials in which lithium metal or lithium ion can be intercalated and then deintercalated. Such batteries using carbonaceous materials generally have an advantage of increased discharge capacity. Even in the battery, however, lithium metal is deposited and the dendrite is formed on the carbonaceous material when the battery is overcharged or rapidly-charged because the carbonaceous material itself is an electric conductor. Therefore, the amount of the cathode active material is usually lowered so as to prevent the battery from overcharging. In such battery, however, the discharge capacity is not satisfactorily increased due to the restriction of the amount of the active material. Further, since the density of the carbonaceous material is relatively low, its capacity per volume is small. Consequently, the charging-discharging capacity of the battery using such carbonaceous material is restricted for the above two reasons; the restrictions of the amount of the active material and the small capacity per volume.

As known examples of the anode active material other than lithium metal, alloy thereof and carbonaceous material, there can be mentioned $TiS_2$ in which lithium ion can be intercalated and deintercalated, $LiTiS_2$ (U.S. Pat. No. 3,983, 476), $WO_2$ having a futile structure (U.S. Pat. No. 4,198, 476), iron oxides such as $FeO$, $Fe_2O_3$ and $Fe_3O_4$, and cobalt oxides such as $CoO$, $Co_2O_3$ and $Co_3O_4$ (Japanese Patent Provisional Publication No. 3(1991)-291862) and spinel compounds such as $Li_xFe(Fe_2)O_4$ (U.S. Pat. No. 4,507,371). Further, a battery in which both anode and cathode active materials are metal calcogenide, e.g., $V_2O_5$ or $TiS_2$ as a cathode active material, and electrochemically synthesized $Li_xFe_2O_3$ as an anode active material, is proposed ((U.S. Pat. No. 4,464,447; *Journal of Power Sources* vol. 8(1982) pp. 289).

In batteries using the above transition metal oxide or sulfide, the amount of formation of dendrite or moss is less than that of batteries using carbonaceous material. However, each of these known compounds has too high redox potential to Give a nonaqueous secondary battery having high discharge potential (e.g., potential of 3 V or higher (which Generally corresponds to average potential of 2.5 V or higher)), compared with the batteries using carbonaceous material. Further, the above combination also shows a similar characteristics.

As solvents for an electrolytic solution (organic electrolyte) used in such lithium secondary battery, studied is use of nonaqueous solvents of cyclic carbonates such as propylene carbonate (PC), ethylene carbonate (EC) and butylene carbonate (BC); cyclic esters such as γ-butyrolactone (γ-BL) and γ-valerolactone (γ-VL); chain carbonates such as dimethyl carbonate (DME) and diethyl carbonate (DEC); chain esters such as methyl acetate (MA); cyclic ethers such as tetrahydofuran (THF) and dioxolan (DOL) and chain ethers such as dimethoxyethane (DME) and diethyl ether.

As for a lithium salt used as an electrolyte of the electrolytic solution, inorganic salts such as $LiClO_4$, $LiBF_4$, $LiAsF_6$, $LiPF_6$ and $LiCF_3SO_3$ have been studied. An electrolytic solution using $LiClO_4$ exhibits a high electric conductivity, but it is occasionally detonated under severe conditions such as high temperature. In contrast, the $LiCF_3SO_3$ exhibits high stability, and double salts of Lewis acids such as $LiBF_4$, $LiAsF_6$ and $LiPF_6$ show enhanced discharge characteristics. Hence, studies with respect to the $LiCF_3SO_3$ and the double salts of Lewis acids have been mainly performed in these days.

As combinations of a solvent and a fluorine-containing lithium salt, the following examples have been proposed.

In a nonaqueous secondary battery using Li metal as an anode active material and fluorine-containing lithium salt as electrolyte, the combination of a mixed solvent of ethylene carbonate and 2-methyl-tetrahydrofuran and $LiAsF_6$ or $LiBF_4$ has been proposed (Japanese Patent Provisional Publication No. 59(1984)-96666).

In a nonaqueous secondary battery using cabonaceous material as an anode active material and a fluorine-containing lithium salt as electrolyte, the combination of a mixed solvent of cyclic carbonate and cyclic ester (e.g., PC and γ-BL) and LiXFn wherein X is B, P, As or Sb, and n is 4 or 6 (Japanese Patent Provisional Publication No. 2(1990)-215059) and the combination of a mixed solvent of cyclic esters, esters, cyclic ether and/or ethers (e.g., PC and 2-DME) to which N-methyl-2-pyrrolydone is added and $LiPF_6$ (Japanese Patent Provisional Publication No. 4(1992)-115471) have been proposed.

However, such batteries using the anode active material (Li metal or carbonaceous material) and the electrolytic solution, are not so improved in formation of the dendrite as to satisfy characteristics such as shelf life, characteristics in charge-discharge cycle, discharging characteristics and safety.

In a nonaqueous secondary battery using transition metal oxide as an anode active material and a fluorine-containing lithium salt as electrolyte, Japanese Patent Provisional Publication No. 3(1991)-291862, which is mentioned previously, describes the combination of propylene carbonate or a mixed solvent of ethylene carbonate and dimethoxyethane (1:1, volume ratio) and $LiAsF_6$.

Nonaqueous secondary batteries have conventionally employed propylene carbonate as solvent for an electrolytic solution. The above nonaqueous secondary battery uses ethylene carbonate in the amount of 50% in volume other than use of propylene carbonate. The use of ethylene carbonate increase stability of the electrolytic solution. Therefore, the battery scarecely brings about the lowering of the discharge capacity during repeated charging and discharging procedures. However, the battery does not satisfy various characteristics at temperatures lower than room temperature due to its high melting point.

SUMMARY OF THE INVENTION

It is an object of the present invention to provide a nonaqueous secondary battery having high discharging voltage, high discharge capacity and a long life in the charge-discharge cycle, at both room temperature and temperatures lower than room temperature.

In order to improve particularly lowering of discharge capacity during repeated charging and discharging procedures at temperatures lower than room temperature, the present inventor has studied as to which kind of electrolytic solution is effective in improvement of the above characteristics. The study has been performed using the nonaqueous secondary battery with transition metal oxide as an anode active material in which formation of dendrite or moss scarcely occurs. As a result, he has found that use of electrolytic solutions comprising the mixed solvent containing ethylene carbonate of 5 to 40% in volume and specific solvents and a fluorine-containing lithium salt is extremely improved in the above characteristics at temperatures lower than room temperature.

The invention resides in a nonaqueous secondary battery which comprises a cathode active material, an anode active material and an electrolytic solution; wherein said anode active material comprises a transition metal oxide, and said electrolytic solution comprises a fluorine-containing lithium salt in a mixed solvent which comprises ethylene carbonate of 5 to 40% in volume and at least one selected from the group consisting of chain carbonic acid esters, cyclic carbonic acid esters having carbon atoms of not less than 5, cyclic esters, chain ethers and cyclic ethers, the latter being in the amount of 60 to 95% in volume.

Preferred embodiments of the above nonaqueous secondary battery are as follows:

1) The nonaqueous secondary battery wherein said mixed solvent comprises ethylene carbonate and at least one selected from the group consisting of chain carbonic acid esters, cyclic carbonic acid esters having carbon atoms of not less than 5, chain ethers and cyclic ethers.
2) The nonaqueous secondary battery wherein said mixed solvent comprises ethylene carbonate and at least one selected from the group consisting of chain carbonic acid esters, cyclic carbonic acid esters having carbon atoms of not less than 5.
3) The nonaqueous secondary battery wherein said mixed solvent comprises ethylene carbonate and chain carbonic acid esters.
4) The nonaqueous secondary battery wherein said mixed solvent comprises ethylene carbonate, chain carbonic acid esters and at least one selected from the group consisting of cyclic carbonic acid esters having carbon atoms of not less than 5, cyclic esters, chain ethers and cyclic ethers
5) The nonaqueous secondary battery wherein said chain carbonates consist of diethyl carbonate, dimethyl carbonate and methyl ethyl carbonate.
6) The nonaqueous secondary battery wherein said cyclic carbonates having carbon atoms of not less than 5 consist of butylene carbonate.
7) The nonaqueous secondary battery wherein the cyclic esters consist of γ-butyrolactone.
8) The nonaqueous secondary battery wherein the chain ethers consist of dimethoxyethane.
9) The nonaqueous secondary battery wherein the cyclic ethers consist of tetrahydrofuran.
10) The nonaqueous secondary battery wherein said mixed solvent contains ethylene carbonate and at least one selected from the group consisting of dimethyl carbonate, diethyl carbonate, ethyl methyl carbonate, butyl carbonate, γ-butyrolactone, dimethoxyethane and tetrahydrofuran.
11) The nonaqueous secondary battery wherein the mixed solvent contains ethylene carbonate in the amount of 5 to 40% in volume.
12) The nonaqueous secondary battery wherein the lithium salt is represented by $LiXF_n$:
in which X is B, P, As or Sb, "n" is 4 when X is B, and "n" is 6 when X is P, As or Sb.
13) The nonaqueous secondary battery wherein the lithium salt is at least one selected from the group consisting of $LiBF_4$, $LiPF_6$ and $LiCF_3SO_3$.
14) The nonaqueous secondary battery wherein the anode active material is a transition metal oxide of which an inherent crystal structure has been changed by insertion of lithium ions, and is in the condition that said changed crystal structure is essentially not changed during repeated charging and discharging.
15) The nonaqueous secondary battery wherein the anode active material is obtained by electrochemical insertion of lithium ions.
16) The nonaqueous secondary battery wherein the anode active material comprises a lithium-containing transition metal oxide represented by $Li_xMO_j$ wherein M is at least one transition metal selected from the group consisting of Ti, V, Mn, Co, Fe, Ni, Cr, Nb and Mo, x is in the range of 0.17 to 11.25, and j is in the range of 1.6 to 4.1.
17) The nonaqueous secondary battery wherein the cathode active material comprises a lithium-containing transition metal oxide represented by $Li_yMO_z$ wherein M is at least one transition metal selected from the group consisting of Co, Fin, Ni, V and Fe, y is in the range of 0.3 to 1.2, and z is in the range of 1.4 to 3.

The invention also resides in a nonaqueous secondary battery which comprises a cathode active material, an anode active material and an electrolytic solution;

wherein the anode active material comprises a transition metal oxide of which an inherent crystal structure has been changed by insertion of lithium ions and is in the condition that the changed crystal structure is essentially not changed during repeated charging and discharging, and the electrolytic solution comprises a fluorine-containing lithium salt in a mixed solvent which comprises ethylene carbonate and at least one selected from the group consisting of chain carbonic acid esters, cyclic carbonic acid esters having carbon atoms of not less than 5, cyclic esters, chain ethers and cyclic ethers.

Preferred embodiments of the above nonaqueous secondary battery are as follows:

1) The nonaqueous secondary battery wherein the mixed solvent contains ethylene carbonate in the amount of not more than 48% in volume.
2) The nonaqueous secondary battery wherein the mixed solvent contains ethylene carbonate in the amount of not more than 45% in volume.
3) The nonaqueous secondary battery wherein the mixed solvent comprises ethylene carbonate and at least one selected from the group consisting of chain carbonic acid esters, cyclic carbonic acid esters having carbon atoms of not less than 5, chain ethers and cyclic ethers.
4) The nonaqueous secondary battery wherein the mixed solvent comprises ethylene carbonate and at least one selected from the group consisting of chain carbonic acid esters, cyclic carbonic acid esters having carbon atoms of not less than 5.
5) The nonaqueous secondary battery wherein the mixed solvent comprises ethylene carbonate and chain carbonic acid esters, or comprises ethylene carbonate, chain carbonic acid esters and at least one selected from the group consisting of cyclic carbonic acid esters having carbon atoms of not less than 5, cyclic esters, chain ethers and cyclic ethers.

6) The nonaqueous secondary battery wherein the mixed solvent contains ethylene carbonate in the amount of 5 to 45% in volume.
7) The nonaqueous secondary battery wherein the lithium salt is at least one selected from the group consisting of $LiBF_4$, $LiPF_6$ and $LiCF_3SO_3$.
8) The nonaqueous secondary battery wherein the anode active material comprises a lithium-containing transition metal oxide represented by $Li_xMO_j$ wherein M is at least one transition metal selected from the group consisting of Ti, V, Mn, Co, Fe, Ni, Cr, Nb and Mo, x is in the range of 0.17 to 11.25, and j is in the range of 1.6 to 4.1.
9) The nonaqueous secondary battery wherein the cathode active material comprises a lithium-containing transition metal oxide represented by $Li_yMO_z$ in which M is at least one transition metal selected from the group consisting of Co, Mn, Ni, V and Fe, y is in the range of 0.3 to 1.2, and z is in the range of 1.4 to 3.

"Transition metals" in the invention means metals of atomic number 21 (Sc) to atomic number 30 (Zn), atomic number 39 (Y) to atomic number 48 (Cd), and atomic number 57 (La) to atomic number 80 (Hg).

The nonaqueous secondary battery of the invention which comprises an anode active material of transition metal oxide, a cathode active material and the specific electrolytic solution (organic electrolyte), is extremely improved in discharging voltage, discharge capacity and life in the charge-discharge cycle at temperatures lower than room temperature, compared with the conventional nonaqueous secondary battery.

In more detail, the nonaqueous secondary battery of the invention employs a transition metal oxide, which scarcely produces dendrite, as an anode active material to require assured safety, and further employs the specific electrolytic solution obtained by dissolving fluorine-containing lithium salt in a mixed solvent containing ethylene carbonate of 5 to 40% in volume. Ethylene carbonate hardly reacts with the transition metal oxide but it deteriorates characteristics at temperatures lower than room temperature. However, the use of such ethylene carbonate in the amount of 5 to 40% enables improvement of the above characteristics at temperatures lower than room temperature.

Particularly, the above excellent characteristics can be easily obtained by employing $LiBF_4$, $LiPF_6$ or $LiCF_3SO_3$ (preferably $LiPF_6$) as a lithium salt.

DETAILED DESCRIPTION OF THE INVENTION

Figure 1:
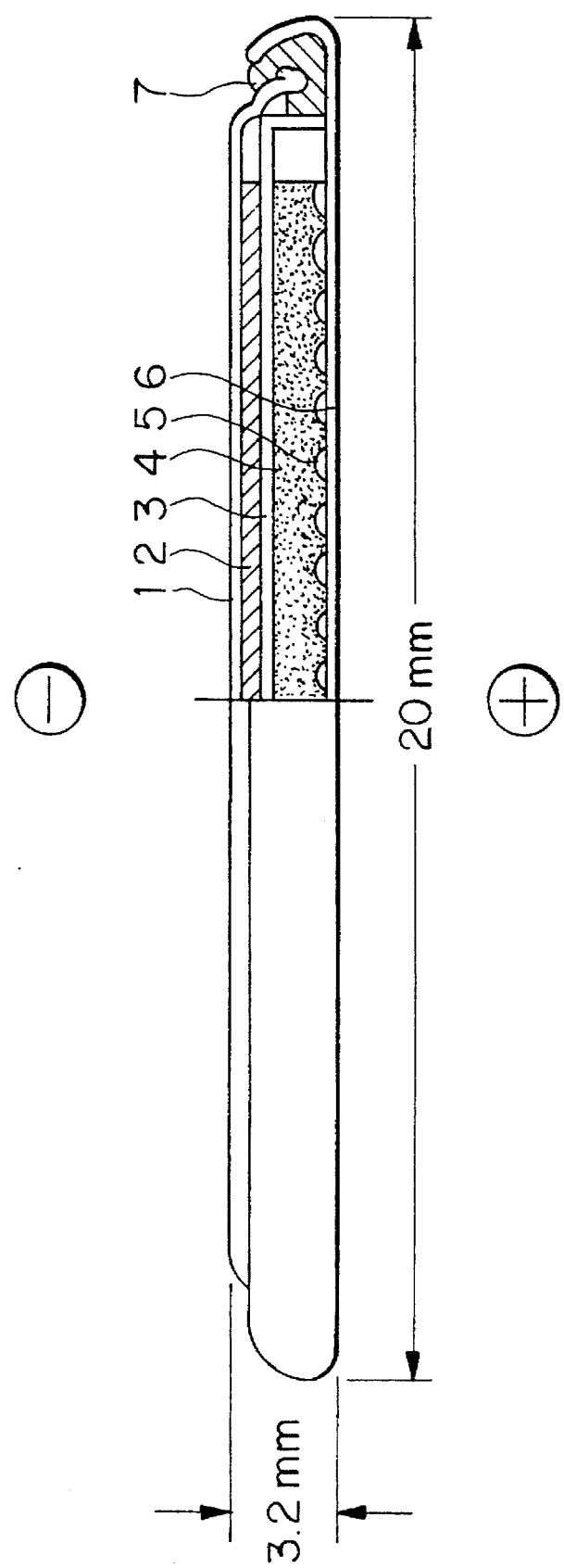
FIG. 1 is a schematic sectional view of a typical battery of coin-type according to the invention.

The nonaqueous secondary battery of the invention has a basic structure comprising an anode active material, a cathode active material and an electrolytic solution prepared by dissolving a fluorine-containing lithium salt in a mixed solvent containing ethylene carbonate.

The mixed solvent employed for an electrolytic solution (organic electrolyte) of the invention contains ethylene carbonate of 5 to 40% in volume % and at least one selected from the group consisting of carbonic acid esters, cyclic carbonic acid esters having carbon atoms of not less than 5, cyclic esters, chain ethers and cyclic ethers, the latter being in the amount of 60 to 95% in volume.

The chain carbonates are preferred to be carbonates having 3 to 8 carbon atoms. Examples of the chain carbonates include dimethyl carbonate (DMC), diethyl carbonate (DEC), dipropyl carbonate (DPC), methyl ethyl carbonate (MEC), methyl propyl carbonate (MPC) and ethyl propyl carbonate (EPC). Preferred are dimethyl carbonate (DMC), diethyl carbonate (DEC) and ethyl methyl carbonate (EMC), and particularly preferred are dimethyl carbonate (DMC) and diethyl carbonate (DEC).

The cyclic carbonates having carbon atoms of not less than 5 are preferred to be carbonates having 5 to 8 carbon atoms. Examples of the cyclic carbonates include 1,2-butylene carbonate (1,2-BC), 2,3-butylene carbonate (2,3-BC), 1,2-pentene carbonate (1,2-PC) and 2,3-pentene carbonate (2,3-PC). Preferred are 1,2-butylene carbonate and 2,3-butylene carbonate, and particularly preferred is 1,2-butylene carbonate.

The cyclic esters are preferred to be esters having 3 to 8 carbon atoms. Examples of the cyclic esters include β-butyrolactone (β-BL), γ-butyrolactone (γ-BL), γ-valero-lactone (γ-VL) and δ-valerolactone (δ-VL). Preferred are γ-butyrolactone (γ-BL), γ-valerolactone (γ-VL) and δ-valerolactone (δ-VL). Particularly Preferred is γ-butyrolactone (γ-BL).

The chain ethers are preferred to be ethers having 4 to 8 carbon atoms. Examples of the chain ethers include dimethoxyethane (DME), diethoxyethane (DEE), methoxyethoxyethane (MEE), dibutoxyethane (DBE), dimethoxypropane (DMP), diethoxypropane (DEP) and methoxyethoxypropnane (MEP). Preferred are dimethoxyethane (DME), diethoxyethane (DEE) and methoxyethoxyethane (MEE), and particularly preferred are dimethoxyethane (DME) and diethoxyethane (DEE). Dimethoxyethane (DME) is most preferred.

The cyclic ethers are preferred to be ethers having 3 to 8 carbon atoms. Examples of the cyclic ethers include tetrahydofuran (THF), 2-methyl-tetrahydrofuran (2-MTHF), 1,3-dioxolan (1,3-DOL), 1,2-dioxolan (1,2-DOL), 2-methyldioxolan (2MDOL) and 4-methyl-dioxolan (4MDOL). Preferred are tetrahydofuran (THF), 2-methyl-tetrahydofuran (2-MTHF), 1,3-dioxolan (1,3-DOL) and 1,2-dioxolan (1,2-DOL) and particularly preferred are tetrahydofuran (THF) and 2-methyl-tetrahydrofuran (2-MTHF). Tetrahydrofuran (THF) is most preferred.

The mixed solvent of the invention generally comprises ethylene carbonate of 5 to 40% in volume and at least one (of 60 to 95% in volume) selected from the group consisting of chain carbonic acid esters, cyclic carbonic acid esters having carbon atoms of not less than 5, chain ethers and cyclic ethers.

The mixed solvent preferably comprises ethylene carbonate of 5 to 40% in volume and chain carbonic acid esters; or comprises ethylene carbonate of 5 to 40% in volume, chain carbonic acid esters and at least one selected from the group consisting of cyclic carbonic acid esters having carbon atoms of not less than 5, cyclic esters, chain ethers and cyclic ethers. The mixed solvent more preferably comprises ethylene carbonate of 5 to 40% in volume, chain carbonic acid esters and at least one selected from the group consisting of cyclic carbonic acid esters having carbon atoms of not less than 5, cyclic esters, chain ethers and cyclic ethers. Use of the chain carbonic acid esters in combination of ethylene carbonate greatly improves various characteristics at low temperatures and further elongates a life in the charge-discharge cycle. Use of the cyclic carbonic acid esters in combination of ethylene carbonate shows the effect similar to that obtained by use of the chain carbonic acid esters although the effect is level lower than that of the chain carbonic acid esters. Use of the ethers also shows the similar effect.

An example of the mixed solvent generally comprises ethylene carbonate of 5 to 40% in volume and at least one ester selected from the group consisting of dimethyl carbonate, diethyl carbonate, ethyl methyl carbonate and butylene carbonate, and/or one ether selected from the group consisting of dimethoxyethane and tetrahydrofuran, the latter being in the amount of 60 to 95% in volume. An example of the mixed solvent preferably comprises ethylene carbonate of 5 to 40% in volume and at least one ester selected from the group consisting of dimethyl carbonate, diethyl carbonate and butylene carbonate, and/or one ether selected from the group consisting of dimethoxyethane and tetrahydrofuran. An example of the mixed solvent more preferably comprises ethylene carbonate of 5 to 40% in volume and at least one ester selected from the group consisting of diethyl carbonate, dimethyl carbonate and butylene carbonate, or comprises ethylene carbonate of 5 to 40% in volume and at least one ester selected from the group consisting of diethyl carbonate, dimethyl carbonate and dimethoxyethane.

The mixed solvent of the invention contains ethylene carbonate in the amount of 5 to 40% in volume, preferably in the amount of 5 to 35% in volume, more preferably in the amount of 10 to 35% in volume, and most preferably in the amount of 10 to 30% in volume.

Chain carbonic acid esters, cyclic carbonic acid esters having carbon atoms of not less than 5, cyclic esters, chain ethers and cyclic ethers which are employed in the mixed solvent are generally used in the following amounts, respectively.

The carbonic acid esters are generally employed in the range of 10 to 95% in volume, preferably in the range of 10 to 80% in volume, and more preferably in the range of 10 to 70% in volume. The carbonic acid esters having carbon atoms of not less than 5 are generally employed in the range of 5 to 70% in volume, preferably in the range of 10 to 50% in volume, and more preferably in the range of 10 to 40% in volume. The cyclic esters are generally employed in the range of 10 to 60% in volume, preferably in the range of 10 to 50% in volume, and more preferably in the range of 10 to 40% in volume. The chain ethers are generally employed in the range of 10 to 95% in volume, preferably in the range of 10 to 80% in volume, and more preferably in the range of 10 to 70% in volume. The cyclic ethers are generally employed in the range of 10 to 95% in volume, preferably in the range of 10 to 80% in volume, and more preferably in the range of 10 to 70% in volume.

In the case of combination of ethylene carbonate with the esters (namely, carbonic acid esters, cyclic carbonic acid esters having carbon atoms of not less than 5 and cyclic esters), the amount of the esters is generally in the range of 5 to 90% in volume, preferably in the range of 10 to 80% in volume and more preferably contained in the range of 20 to 80% in volume. The amount of the chain carbonic acid esters and cyclic carbonic acid esters (not less than five carbon atoms) per the total amount of the esters is generally in the range of 30 to 100% in volume, preferably in the range of 50 to 100% in volume and more preferably in the range of 70 to 100% in volume. Further, the ratio of the amount of the cyclic carbonic acid esters and that of chain carbonic acid esters is generally in the range of 10:90 to 80:20 (chain esters:cyclic esters), preferably in the range of 20:80 to 60:40, and more preferably in the range of 20:80 to 50:50. However, the cyclic carbonic acid esters and the chain carbonic esters each may be singly employed as esters, and in this case the chain carbonic esters is preferably employed singly, as mentioned above.

In the case of combination of ethylene carbonate and the ethers (namely chain ethers and cyclic ethers), the amount of the ethers is generally in the range of 5 to 70% in volume, preferably in the range of 10 to 70% in volume and more preferably in the range of 10 to 60% in volume. Further, the ratio of the amount of the chain ethers and that of cyclic ethers is generally in the range of 20:80 to 80:20 (chain ethers:cyclic ethers), preferably in the range of 20:80 to 60:40, and more preferably in the range of 20:80 to 50:50. However, the cyclic ethers and the chain ethers each may be only employed as esters, and in this case the chain ethers is preferably employed singly.

In the case of combination of ethylene carbonate, the above esters and the above ethers, the ratio of the amount of the esters and that of ethers is generally in the range of 10:90 to 90:10 (esters:ethers), preferably in the range of 30:70 to 90:10, and more preferably in the range of 50:50 to 90:10. In this case, the amount of the chain and cyclic carbonates per the total amount of the esters is generally in the range of 30 to 100% in volume, preferably 50 to 100% in volume and more preferably 70 to 100% in volume. Further, the ratio of the amount of the chain carbonates and that of cyclic carbonates is generally in the range of 10:90 to 80:20, preferably in the range of 20:80 to 60:40, and more preferably in the range of 20:80 to 50:50. Further, the amount of the ethers is generally in the range of 5 to 70% in volume, preferably in the range of 10 to 70% in volume and more preferably in the range of 10 to 60% in volume. However, the cyclic carbonic acid esters and the chain carbonic esters each may be singly employed as esters, and in this case the chain carbonic esters is preferably employed singly. The ratio of the amount of the chain ethers and that of cyclic ethers is generally in the range of 20:80 to 80:20, preferably in the range of 20:80 to 60:40, and more preferably in the range of 20:80 to 50:50. However, the cyclic ethers and the chain ethers each may be only employed as esters, and in this case the chain ethers is preferably employed singly.

Lithium salts (electrolytes) employed for the electrolytic solution of the invention are lithium salts containing fluorine. Examples of the lithium salts include $LiBF_4$, $LiPF_6$, $LiAsF_6$, $LiSbF_6$, $LiCF_3SO_3$ and $LiCF_3CO_2$. However, the lithium salts are not restricted to these salts.

The lithium salt generally is $LiCF_3SO_3$ or the salt represented by $LiXF_n$ (X: B, P, As or Sb, "n" is 4 when X is B, and is 6 when X is P, As or Sb).

$LiXF_n$ is a double salt of Leis Acid obtained by the following formula:

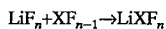

Examples of the double salt include $LiBF_4$, $LiPF_6$, $LiAsF_6$ and $LiSbF_6$.

Preferred examples of the lithium salt include $LiBF_4$, $LiPF_6$ and $LiCF_3SO_3$, more preferably $LiBF_4$ and $LiPF_6$, and most preferably $LiPF_6$. These preferred lithium salts ($LiBF_4$, $LiPF_6$ and $LiCF_3SO_3$) exhibit high electric conductivity in combination with the mixed solvent of the invention, and particularly $LiPF_6$ shows high electric conductivity and high stability. Hence, the batteries using the above lithium salts exhibit high discharging voltage, high discharge capacity and a long life in the charge-discharge cycle.

In the invention, although the concentration of the lithium salt may have any value, it preferably is in the range of 0.2 to 3M (molarity), more preferably in the range of 0.5 to 2M, and most preferably in the range of 0.6 to 1.5M.

In combination with the organic electrolyte (electrolytic solution), solid electrolytes described below are also employable.

Solid electrolytes can be classified into inorganic solid electrolytes and organic solid electrolytes.

As the inorganic solid electrolytes, lithium nitride, lithium halide and oxyacidic salts of lithium can be mentioned. Examples of the inorganic solid electrolytes preferably employable for the invention include $Li_3N$, LiI, $Li_5NI_2$, $Li_3N$-LiI-LiOH, $LiSiO_4$, $LiSiO_4$-LiI-LiOH (Japanese Patent Provisional Publication No. 49(1974)-81899), $xLi_3PO_4$-$(1-x)Li_4SiO_4$ (Japanese Patent Provisional Publication No. 59(1984)-60866), $Li_2SiS_3$ (Japanese Patent Provisional Publication No. 60(1985)-501731) and phosphorus sulfide compounds (Japanese Patent Provisional Publication No. 62(1987)-82665).

Examples of the organic solid electrolytes employable for the invention include: polyethylene oxide derivatives and polymers containing said derivatives (Japanese Patent Provisional Publication No. 63(1988)-135447); polypropylene oxide derivatives and polymers containing said derivatives; polymers containing ion-dissociating groups (Japanese Patent Provisional Publication Nos. 62(1987)-254302, 62(1987)-254303 and 63(1988)-193954); a mixture of polymers containing ion-dissociating groups and the above-mentioned aprotic electrolytic solutions (U.S. Pat. Nos. 4,792,504 and 4,830,939, Japanese Patent Provisional Publication Nos. 62(1987)-22375, 62(1987)-22376, 63(1988)-22375, 63(1988)-22776 and 1(1989)-95117); phosphoric acid ester polymer (Japanese Patent Provisional Publication No. 61(1986)-256573); and polymer matrix material containing aprotic polar solvent (U.S. Pat. Nos. 4,822, 70 and 4,830,939, Japanese Patent Provisional Publication No. 63(1988)-239779, Japanese Patent Application Nos. 2(1990)-30318 and 2(1990)-78531).

In addition to the above solid electrolytes, an electrolytic solution containing polyacrylonitrile (Japanese Patent Provisional Publication No. 62(1987)-278774) may be also employed. Further, inorganic and organic solid electrolytes may be used in combination (Japanese Patent Provisional Publication No. 60(1985)-1768).

The anode active material employable for the invention is not particularly restricted, so long as it is a transition metal oxide. Examples of the anode active material include compounds of spinel structure having a formula $A(B)_2X_4$ (A: H or Li, B: metal ion, X: element of Ia group or IIa group), $WO_2$ having a futile structure, lithium compounds of $Fe_2O_3$, $Nb_2O_5$, chemically-synthesized $Li_{0.1}V_2O_5$, $LiNi_xCo_{1-x}O_2$ ($0 \leq x<1$), iron oxides such as FeO, $Fe_2O_3$ and $Fe_3O_4$, cobalt oxides such as CoO, $Co_2O_3$ and $Co_3O_4$, and lithium-containing transition metal oxides obtained by burning.

The transition metal oxide employed for the anode active material generally is a lithium-containing transition metal oxide, and is preferred to be a transition metal oxides of which an inherent crystal structure has been changed by insertion of lithium ions and is in the condition that the changed crystal structure is essentially not changed during repeated charging and discharging.

In the case of using the above preferred transition metal oxide as the anode active material, the amount of ethylene carbonate of the mixed solvent is not restricted to the range of 5 to 40% in volume. Even if a battery using the above transition metal oxide employs the mixed solvent containing ethylene carbonate in the amount outside the range, it exhibits satisfactory characteristics in discharging voltage, discharge capacity and life in the charge-discharge cycle at both room temperatures and temperatures lower than room temperature. In the battery using the above transition metal oxide, the amount of ethylene carbonate contained in the mixed solvent generally is not more than 48% in volume, preferably is not more than 45% in volume and more preferably is in the range of 5 to 45% in volume. The more preferred embodiments of the mixed solvent are the same as those mentioned above.

The particularly preferred anode active material is obtained by inserting (preferably electrochemically) lithium ions to a transition metal oxide which may contain lithium. In this case, the insertion of lithium ions is carried out until an inherent crystal structure of the transition metal oxide has been changed. Further, the resultant changed crystal structure is not changed during repeated charging and discharging. The change of the inherent crystal structure means change from a certain crystal structure to a different crystal structure, or change from a certain crystal structure to a structure having no crystal structure (noncrystal structure). The above change of inherent crystal structure and no change of the lithium-inserted crystal structure can be confirmed on X-ray diffractograms.

The transition metal oxide prior to insertion of lithium (hereinafter is referred to as a precursor for an anode active material) is preferably obtained by mixing a lithium compound and one or more transition metal compound(s) at a ratio of the lithium compound and the total transition metal compounds (lithium compound/total transition metal compounds) of not more than 3.1 by mole to subjecting them to reaction. The transition metal generally includes at least one metal selected from the group consisting of Ti, V, Mn, Co, Ni, Fe, Cr, Nb and Mo. The transition metal preferably includes at least one metal selected from the group consisting of Ti, V, Mn, Co, Ni and Fe. The ratio of the lithium compound and the total transition metal compounds preferably is in the range of 0.2 to 3.1.

The precursor for the anode active material of the invention generally is at least one transition metal oxide represented by $Li_pMO_j$ wherein M is at least one transition metal of which at least one is selected from the group consisting of Ti, V, Mn, Co, Fe, Ni, Cr, Nb and Mo, p is in the range of 0 to 3.1, and j is in the range of 1.6 to 4.1.

Preferred examples of transition metal oxides represented by the $Li_pMO_j$ include $LiVO_{3.1}$, $LiTiO_{2.3}$, $CoVO_{3.7}$, $LiCoVO_{4.0}$, $LiCo_{0.5}V_{0.5}O_{2.1}$, $LiNiVO_{4.0}$, $Li_{0.75}Ni_{0.5}V_{0.5}O_{2.1}$, $Li_{1.75}Ni_{0.5}V_{0.5}O_{2.4}$, $LiTi_{0.5}V_{0.5}O_{2.9}$, $LiMn_{0.5}V_{0.5}O_{2.5}$, $LiFe_{0.5}Mn_{0.5}O_{2.1}$, $LiCo_{0.25}V_{0.75}O_{2.8}$, $LiNi_{0.25}V_{0.75}O_{2.7}$, $LiNi_{0.05}V_{0.95}O_{3.1}$, $LiFe_{0.05}V_{0.95}O_{3.1}$, $LiMn_{0.05}V_{0.95}O_{3.0}$, $LiCa_{0.05}V_{0.95}O_{3.2}$, $LiCo_{0.75}V_{0.25}O_{1.9}$, $LiMn_{0.25}Ti_{0.5}V_{0.25}O_{2.6}$, $LiCr_{0.05}V_{0.95}O_{3.2}$, $LiNb_{0.05}V_{0.95}O_{3.1}$ and $LiMo_{0.05}V_{0.95}O_{3.0}$. The value of oxygen of each compound was obtained by substracting the number of oxygen of the compound after burning from that before burning. Accordingly, the value generally has an error of −10 to +10%.

The precursor for the anode active material preferably is a transition metal oxide represented by $Li_pM_{1q1}M_{2q2}\ldots M_{nqn}O_j$ wherein $M_1M_2\ldots M_n$ are each a transition metal of which at least one is selected from the group consisting of Ti, V, Mn, Co, Ni and Fe, p is in the range of 0 to 3.1, $q1+q2+\ldots qn$ is 1, n is in the range of 1 to 10, and j is in the range of 1.6 to 4.1. In the above formula, it is further preferred that p is in the range of 0 to 3.1, n is in the range of 1 to 4, and j is in the range of 1.8 to 4.1. Particularly preferred are p of 0.2 to 3.1, n of 1 to 3, and j of 1.8 to 4.1.

The precursor for the anode active material advantageously contains a transition metal such as V, Cr, Nb or Mo which has stably 5 or 6 valence, from the viewpoint of discharge capacity. In this regard, the precursor preferably contains V.

The above precursor for the anode active material containing V generally is a transition metal oxide represented by $Li_xM_qV_{1-q}O_j$ wherein M is at least one transition metal (M preferably is at least one metal selected from the group consisting of Ti, Mn, Co, Ni, Fe, Cr, Nb and Mo), x is in the range of 0.17 to 11.25, q is in the range of 0 to 0.7, and j is in the range of 1.3 to 4.1. The precursor preferably is a transition metal oxide represented by $Li_pM_{1q1}M_{2q2}\ldots M_{nqn}V_{qv}O_j$ wherein $M_1M_2\ldots M_n$ are each a transition metal, p is in the range of 0 to 3.1, $q1+q2+\ldots qn$ is 1, n is in the range of 1 to 9, and j is in the range of 1.3 to 4.1. The precursor for the anode active material containing V, more preferably is a transition metal oxide represented by $Li_pM_{1q1}M_{2q2}V_{1-(q1+q2)}O_j$ wherein $M_1$ and $M_2$ are each a transition metal, p is in the range of 0.2 to 3.1, q1+q2 is in the range of 0 to 0.7, and j is in the range of 1.3 to 4.1. The precursor for the anode active material containing V, most preferably is a transition metal oxide represented by $Li_p\text{-}Co_qV_{1-q}O_j$ or $Li_pNi_qV_{1-q}O_j$ wherein $M_1$ and $M_2$ are each a transition metal, p is in the range of 0.3 to 2.2, q is in the range of 0.02 to 0.7, and j is in the range of 1.5 to 2.5.

Particularly preferred examples of the precursor for the anode active material include $Li_pCoVO_4$ or $Li_pNiVO_4$ wherein p is in the range of 0.3 to 2.2.

The anode active material preferably employable for the invention is obtained by inserting lithium ions into the above precursor for the anode active material and is different in crystal structure (i.e., X-ray diffractogram) from the precursor.

In the above formulae (e.g., $Li_pMO_j$) of the precursor, the total number of transition metal is "1" and therefore the number may be multiplied by integer in the case of representing a crystallographic composition formula corresponding to the formula or in the case of having plural metals.

As is described above, the anode active material preferably employable for the invention is obtainable by inserting lithium ions into the precursor for the anode active material. Therefore, the anode active material corresponds to the precursor for the anode active material in which $Li_p$ is changed to $Li_x$ (x generally is in the range of 0.17 to 11.25, and mole number of inserted lithium ions is expressed by "x" minus "p").

The anode active material of the invention preferably is a transition metal oxide represented by $Li_xMO_j$ wherein M is at least one transition metal at least of which one is selected from the group consisting of Ti, V, Mn, Co, Fe, Ni, Cr, Nb and Mo, x is in the range of 0.17 to 11.25 and j is in the range of 1.6 to 4.1. x preferably is in the range of 0.26 to 10.2, and more preferably in the range of 0.34 to 9.3. Such anode active material is preferably obtained by inserting lithium ions in the precursor for the anode active material represented by the above formula $Li_pMO_j$.

Further, the anode active material more preferably is a transition metal oxides represented by $Li_xM_qV_{1-q}O_j$ wherein M is a transition metal, x is in the range of 0.17 to 8.15, q is in the range of 0 to 0.7, and j is in the range of 1.3 to 4.1.

The anode active material is preferably obtained by inserting lithium ions into the precursor for the anode active material (i.e., a transition metal oxide or a lithium-containing transition metal oxide), in the following manner. For example, the oxide is caused to react with lithium metal, lithium alloy or lithium butylate, or lithium ion is electrochemically inserted into the oxide.

In the invention, the method of electrochemically inserting lithium ions is preferred. Particularly, it is preferred to electrochemically insert lithium ions into the oxide using a lithium-containing transition metal oxide as the precursor for the anode active material. As the method of electrochemically inserting lithium ions, there can be mentioned a method of discharging a battery of an oxidation-reduction system (e.g., open system (electrolysis) or closed system (battery)) which comprises the aimed lithium-containing transition metal oxide (corresponding to the anode active material) as a cathode active material, lithium metal as an anode active material and a nonaqueous electrolyte containing lithium salt. As the preferred method, there can be mentioned a method of a battery of charging an oxidation-reduction system (e.g., open system (electrolysis) or closed system (battery)) which comprises the lithium-containing transition metal oxide as a cathode active material, the (lithium-containing) transition metal oxide as an anode active material having a different formula from that of the cathode active material and a nonaqueous electrolyte containing lithium salt.

The anode active material generally is obtainable by electrochemically inserting lithium ions in the transition metal oxide of the precursor for the anode active material in the amount of 27 to 1340 mAh (corresponding to 1 to 50 mmole) per 1 g of the oxide. The amount of the lithium ions preferably is in the range of 40 to 1070 mAh (1.5 to 40 mmole), and more preferably in the range of 54 to 938 mAh (2 to 35 mmole).

The ratio of the anode active material and the cathode active material (mentioned later) generally is set up so as to equal each effective equivalent (the effective equivalent means equivalent capable of keeping cycle characteristics). In this case, it is preferred to use either of the materials in more amount than the other.

Cut-off voltage for charge-discharge cycle preferably is voltage that can discharge high voltage and essentially keep cycle characteristic.

The anode active material prepared in the above manner generally has strength of one fifth or less based on strength of a maximum peak of the transition metal oxide prior to insertion of lithium ions, said maximum peak being observed in X-ray diffractogram at the diffraction angle of 5 to 70 degree using Cu-Kα ray. Further, the anode active material preferably has the strength of one tenth or less, and more preferably the strength of one twentieth or less. The strength of "0" means that the precursor for the anode active material is essentially all converted into the anode active material. The location of the "0" almost corresponds to that of the base line of the X-ray diffractogram. Further, it is preferred that at least one peak other than the maximum peak disappears from the diffractogram or at least one new peak appear in the diffractogram.

The anode active material prepared in above manner generally comprises a lithium-containing transition metal oxide, and is characterized by X-ray diffractogram wherein each peak strength observed in X-ray diffractogram at the diffraction angle of 5 to 70 degree using Cu-Kα ray is in the range of 20 to 1,000 cps. The peak strength preferably is in the range of 20 to 800 cps, more preferably in the range of 20 to 500 cps, and most preferably in the range of 20 to 400 cps.

The measurement of the X-ray diffraction is performed in 40 kV and 120 mA at scanning speed of 32°/min. The maximum peak of $LiCoO_2$ used as a standard compound has signal strength of 7990 cps at 18.9° (2θ; 4.691 Å).

The above $LiCoO_2$ is, for example, prepared by mixing $Li_2CO_3$ and $CoCO_3$ at molar ratio of Li/Co=1 in a mortar, transferring the mixture into a porcelain crucible to allow it to stand at 130° C. for 1 hour, subsequently burning it at 900° C. for 6 hour, and then after cooling at 2° C./min, grinding the burned mixture to prepare a powder having mean particle size (median diameter) of approx. 7.5 μm.

In the invention, the anode active material preferably is in the condition that said changed crystal structure is not changed during repeated charging and discharging. Such condition is described in more detail below.

The crystal structure or noncrystal structure of the anode active material is expanded or shrunken through intercalation or deintercalation of lithium ions. Although change of the bonding distance and the like of the structure derived from the above expansion or shrinkage may be produced, basis of the structure (crystal or noncrystal structure) should be not changed. In more detail, an interval of faces, which is determined from the X-ray diffractogram, may be changed in the range of −0.1 to 0.1 Å (preferably −0.05 to 0.05 Å), and strength or half width of the peak may be changed.

As mentioned above, the lithium-inserted anode active material as mentioned above is in the condition that its X-ray diffractogram is not essentially changed by repetition of charging and discharging. For example, $LiCoVO_4$ of precursor for an anode active material has inverse-spinel structure represented by $V^{5+}(Li^+Co^{2+})O_4$. In the case that lithium ions are electrochemically inserted into the oxide, the crystalline structure is changed so that the oxide is converted into an oxide having a unknown crystal structure or noncrystal structure which gives a broad peak at interval of faces of about 2 Å. The oxide having the changed crystal structure or the noncrystal structure is not changed during repeated charging and discharging. The oxide of the invention has a low oxidation-reduction potential and hence the oxide is suitable as an anode active material.

The cathode active material employable for the invention may be any material so long as it can intercalate and deintercalate lithium ions. Preferred is a transition metal oxide. More preferred is a lithium-containing transition metal oxide. The preferred lithium-containing transition metal oxides are lithium-containing transition metal oxides containing at least one selected from the group consisting of Ti, V, Mn, Cr, Ni, Fe, Co, Cu, W and Mo. The cathode active material preferably has different composition from that of the anode active material.

The lithium-containing transition metal oxide used as the cathode active material is preferably obtained by mixing a lithium compound and one or more transition metal compound(s) at a ratio of the lithium compound and the total transition metal compounds (lithium compound/total transition metal compounds) of 0.3 to 2.2 by mole for subjecting them to reaction. The transition metal includes at least one metal selected from the group consisting of Ti, V, Mn, Cr, Ni, Fe, Co, W and Mo. The transition metal preferably includes at least one metal selected from the group consisting of V, Cr, Mn, Co, Ni and Fe.

The cathode active material preferably is at least one transition metal oxide represented by $Li_yMO_z$ wherein M is at least one transition metal of which at least one is selected from the group consisting of Co, Fin, Fe, Ni and V, y is in the range of 0.3 to 1.2, and z is in the range of 1.4 to 3.

The cathode active material more preferably is at least one oxide selected from the group consisting of $Li_yCoO_2$, $Li_yNiO_2$, $Li_yCo_aNi_{1-a}O_2$, $Li_yCo_bV_{1-b}O_z$, $Li_yCo_bFe_{1-b}O_2$, $Li_yMn_2O_4$, $Li_yMn_cCo_{2-c}O_4$, $Li_yMn_cNi_{2-c}O_4$, $Li_yMn_cV_{2-c}O_4$, $Li_yMn_cFe_{2-c}O_4$, a mixture of $Li_yMn_2O_4$ and $MnO_2$, a mixture of $Li_{2y}Mn_2O_3$ and $MnO_2$, and a mixture of $Li_yMn_2O_4$, $Li_{2y}Mn_2O_3$ and $MnO_2$, wherein y is in the range of 0.5 to 1.2, a is in the range of 0.1 to 0.9, b is in the range of 0.8 to 0.98, c is in the range of 1.6 to 1.96, and z is in the range of 2.01 to 5.

The cathode active material more preferably is at least one oxide selected from the group consisting of $Li_yCoO_2$, $Li_yNiO_2$, $Li_yCoaNi_{1-a}O_2$, $Li_yCo_bV_{1-b}O_z$, $Li_yCo_bFe_{1-b}O_2$, $Li_yMn_2O_4$, $Li_yMn_cCo_{2-c}O_4$, $Li_yMn_cNi_{2-c}O_4$, $Li_yMn_cV_{2-c}O_4$ and $Li_yMn_cFe_{2-c}O_4$, wherein y is in the range of 0.7 to 1.04, a is in the range of 0.1 to 0.9, b is in the range of 0.8 to 0.98, c is in the range of 1.6 to 1.96, and z is in the range of 2.01 to 2.3.

The cathode active material most preferably is at least one oxide selected from the group consisting of $Li_yCoO_2$, $Li_yNiO_2$, $Li_yCo_aNi_{1-a}O_2$, $Li_yMn_2O_4$, and $Li_yCo_bV_{1-b}O_z$ wherein y is in the range of 0.7 to 1.1, a is in the range of 0.1 to 0.9, b is in the range of 0.9 to 0.98 and z is in the range of 2.01 to 2.3. Further, in the formulae, y preferably is in the range of 0.7 to 1.04.

The value of "y" is a value prior to charging-discharging procedure, and varies with charging or discharging. Further, the cathode active material of the invention may be a crystalline or noncrystalline compound, and however preferably is a crystalline compound.

In the battery of the invention, the transition metal oxide used as the cathode active material preferably is different from the transition metal oxide used as the anode active material in terms of chemical formula. This means that:
1. the composition of metal elements contained in each oxide is different from each other, or
2. in the case of the combination of $Li_yCo_bV_{1-b}O_z$ (cathode active material) and $Li_pCo_qV_{1-q}O_j$ (anode active material), for example, y differs p, b differs q, and/or z differs j, and particularly b differs q, and/or z differs j.

The cathode active material and the anode active material preferably have essentially different redox potentials from each other (the former is higher than the latter).

The cathode active material employable for the invention can be prepared by chemically or electrochemically introducing lithium into a transition metal oxide, or by burning a lithium compound together with a transition metal compound.

When the cathode active material is prepared by chemically inserting lithium into a transition metal oxide, it is preferable that lithium metal, lithium alloy or butyl lithium is reacted with the transition metal oxide.

Preferably, the cathode active material of the invention is prepared by burning a lithium compound together with a transition metal compound.

The precursor for the anode active material employed in the invention can be also obtained by chemically inserting lithium into a transition metal oxide through solution reaction, or by burning the mixture of the lithium compound and a transition metal compound. The precursor preferably is prepared by the burning.

The burning may be conducted in any temperatures capable of decomposing or melting the mixture employed for the invention. For example, the burning is preferably conducted at a temperature of 250° to 2,000° C., and more preferably at a temperature of 350° to 1,500° C. Further, the burning may be carried out in any gas atmospheres. The cathode active material is preferably burned in air or a gas containing oxygen in an amount more than the other gases (e.g., not less than about 30%), and the precursor for the anode active material preferably is burned in air or the gas containing oxygen in an amount less than the other gas (e.g., not more than about 10%) or in an inert gas (e.g., nitrogen gas or argon gas).

For example, in burning of a mixture of a lithium compound, a vanadium compound and a cobalt compound, a low active material such as $LiVO_3$ or $Li_3VO_4$ is sometimes produced. The precursor for the anode active material may contain such low active material but the low active material may be removed if desired.

The precursor for the anode active materials or the cathode active material employable for the invention is preferably obtained by burning the mixture of the following lithium compounds and transition metal compounds. Examples of lithium compounds are oxygen compounds, oxyacid salts and halogenates. Examples of the transition metal compounds are oxides, salts and complex salts of transition metals having valences of (I)–(VI).

Preferred examples of lithium compounds employable for the invention include lithium oxide, lithium hydroxide, lithium carbonate, lithium nitrate, lithium sulfate, lithium sulfite, lithium phosphate, lithium tetraborate, lithium chlorate, lithium perchlorate, lithium thiocyanate, lithium formate, lithium acetate, lithium oxalate, lithium citrate, lithium lactate, lithium tartrate, lithium pyruvate, lithium trifluoromethanesulfonate, lithium tetraboronate, lithium hexafluorophosphate, lithium fluoride, lithium chloride, lithium bromide and lithium iodide.

Preferred examples of the transition metal compounds employable for the invention include $TiO_2$, lithium titanate, acetylacetonatotitanium, titanium tetrachloride, titanium tetraiodide, titanyl ammonium oxalate, $VO_d$(d=2 to 2.5; compound of d=2.5 is vanadium pentaoxide), lithium compounds of $VO_d$, vanadium hydroxide, ammonium metavanadate, ammonium orthovanadate, ammonium pyrovanadate, vanadium oxysulfate, vanadium oxytrichloride, vanadium tetrachloride, lithium chromate, ammonium chromate, cobalt chromate, acetylacetonatochromium, $MnO_2$, $Mn_2O_3$, manganese hydroxide, manganese carbonate, manganese nitrate, manganese sulfate, ammonium manganese sulfate, manganese sulfite, manganese phosphate, manganese borate, manganese chlorate, manganese perchlorate, manganese thiocyanate, manganese formate, manganese acetate, manganese oxalate, manganese citrate, manganese lactate, manganese tartrate, manganese stearate, manganese fluoride, manganese chloride, manganese bromide, manganese iodide, acetylacetonato manganese, iron(II) oxide, iron(III) oxide, tri-iron tetraoxide, iron(II) hydroxide, iron(III) hydroxide, iron (II) chloride, iron(III) chloride, iron(II) bromide, iron (III) bromide, iron(II) iodide, iron(III) iodide, iron(II) sulfate, iron (III) sulfate, ammonium iron (II) sulfate, ammonium iron (III) sulfate, iron (II) nitrate, iron (III) nitrate, iron(II) phosphate, iron(III) phosphate, iron perchlorate, iron chlorate, iron(II) acetate, iron(III) acetate, iron(II) citrate, iron(III) citrate, ammonium iron(II) citrate, ammonium iron(III) citrate, iron(II) oxalate, iron (III ) oxalate, ammonium iron (II) oxalate, ammonium iron (III) oxalate, CoO, $Co_2O_3$, $Co_3O_4$, $LiCoO_2$, cobalt carbonate, basic cobalt carbonate, cobalt hydroxide, cobalt sulfate, cobalt nitrate, cobalt sulfite, cobalt perchlorate, cobalt thiocyanate, cobalt oxalate, cobalt acetate, cobalt fluoride, cobalt chloride, cobalt bromide, cobalt iodide, hexaminecobalt complex salts (sulfate, nitrate, perchlorate, thiocyanate, oxalate, acetate, fluoride, chloride, bromide and iodide), nickel oxide, nickel hydroxide, nickel carbonate, basic nickel carbonate, nickel sulfate, nickel nitrate, nickel fluoride, nickel chloride, nickel bromide, nickel iodide, nickel formate, nickel acetate, acetylacetonatonickel, copper(I) oxide, copper(II) oxide, copper hydroxide, copper sulfate, copper nitrate, copper phosphate, copper fluoride, copper chloride, ammonium copper chloride, copper bromide, copper iodide, copper formate, copper acetate, copper oxalate, copper citrate, niobium oxychloride, niobium pentachloride, niobium pentaiodide, niobium monoxide, niobium dioxide, niobium trioxide, niobium pentaoxide, niobium oxalate, niobium methoxide, niobium ethoxide, niobium propoxide, niobium butoxide, lithium niobate, $MoO_3$, $MoO_2$, $LiMo_2O_4$, molybdenum pentachloride, ammonium molybdate, lithium molybdate, ammonium molybdophosphate, acetylacetonatomolybdenum oxide, $WO_2$, $WO_3$, tungstic acid, ammonium tungstate and ammonium tungstphosphate.

Particularly preferred examples of transition metal compounds employable for the invention include $TiO_2$, titanyl ammonium oxalate, $VO_d$ (d=2–2.5), lithium compounds of $VO_d$, ammonium metavanadate, $MnO_2$, $Mn_2O_3$, manganese hydroxide, manganese carbonate, manganese nitrate, ammonium manganese sulfate, manganese acetate, manganese oxalate, manganese citrate, iron(II) oxide, iron(III) oxide, tri-iron tetroxide, iron(II) hydroxide, iron (III) hydroxide, iron(II) acetate, iron(III) acetate, iron (II) citrate, iron(III) citrate, ammonium iron(II) citrate, ammonium iron(III) citrate, iron(II) oxalate, iron(III) oxalate, ammonium iron(II) oxalate, ammonium iron(III) oxalate, CoO, $Co_2O_3$, $Co_3O_4$, $LiCoO_2$, cobalt carbonate, basic cobalt carbonate, cobalt hydroxide, cobalt oxalate, cobalt acetate, nickel oxide, nickel hydroxide, nickel carbonate, basic nickel carbonate, nickel sulfate, nickel nitrate, nickel acetate, copper(I) oxide, copper(II) oxide, copper hydroxide, copper acetate, copper oxalate, copper citrate, $MoO_3$, $MOO_2$, $LiMo_2O_4$, $WO_2$ and $WO_3$.

Particularly preferred is the combination of the lithium compounds such as lithium oxide, lithium hydroxide, lithium carbonate and lithium acetate, and the transition metal compounds such as $VO_d$(d=2–2.5), lithium compounds of $VO_d$, ammonium metavanadate, $MnO_2$, $Mn_2O_3$, manganese hydroxide, manganese carbonate, manganese nitrate, iron(II) oxide, iron(III) oxide, tri-iron tetroxide, iron(II) hydroxide, iron (III) hydroxide, iron(II) acetate, iron(III) acetate, iron (II) citrate, iron(III) citrate, ammonium iron(II) citrate, ammonium iron(III) citrate, iron (II) oxalate, iron(III) oxalate, ammonium iron(II) oxalate, ammonium iron(III) oxalate, CoO, $Co_2O_3$, $Co_3O_4$, $LiCoO_2$, cobalt carbonate, basic cobalt carbonate, cobalt hydroxide, cobalt sulfate, cobalt nitrate, nickel oxide, nickel hydroxide, nickel carbonate, basic nickel carbonate, nickel sulfate, nickel nitrate, nickel acetate, $MOO_3$, $MOO_2$, $LiMo_2O_4$ and $WO_3$.

In burning of the lithium compounds and the transition metal compounds, there can be employed the following compounds together with the above compounds. Examples of the compounds include compounds containing $Ca^{2+}$ which are capable of increasing ionic conductive property such as calcium carbonate, calcium chloride, calcium oxide, calcium hydroxide, calcium sulfate, calcium nitrate, calcium acetate, calcium oxalate, calcium citrate and calcium phosphate. Also employable are agents (e.g., compound containing P, B or Si) for forming noncrystalline structure such as $P_2O_5$, $Li_3PO_4$, $H_3BO_3$ and $SiO_2$; and compounds containing alkaline metal ions such as Na, K and Mg and/or elements such as Sn, Al, Ga, Ge, Ce, In and Bi (e.g., oxides thereof, hydroxides thereof, carbonates thereof and nitrates thereof). Preferred are calcium carbonate and $P_2O_5$. The compound preferably is used in the amount of 0.2 to 10 molar %.

The precursor for the anode active material and the cathode active material preferably have a mean grain size of 0.03 to 50 μm. The material having the above grain size can be prepared using a known grinder or classifier. Examples of the grinder or classifier include mortar, ball mill, vibrating ball mill, satellite ball mill, spinning air jet mill and sieve.

Each formula of the compounds prepared by burning is determined by ICP (Inductively Coupled Plasma) emission spectrometry or by the simple method in which the compound is weighed before and after burning and the content of the prepared compound is calculated from the difference of the weight.

The anode active material and the cathode active material preferably employable for the invention, which are prepared in the above manner, is thought to be a compound that their valences are varied with intercalation or deintercalation of lithium ions. Therefore, the anode active material is basically different from a metal-anode active material such as lithium metal or lithium alloy which is dissolved or deposited through charging and discharging. Further, the material is also different from a carbonaceous material. In more detail, the carbonaceous material is not a compound that can change valence, and the material has high conductive property and brings about deposition of lithium during charging and discharging. Thus, the anode active material is a compound of different type from the the metal material and the carbonaceous material.

Examples of materials which can be employed together with the anode active material include: lithium metal, lithium alloys (e.g., Al, Al-Mn [U.S. Pat. No. 4,820,599], Al-Mg [Japanese Patent Provisional Publication No. 57(1982)-98977], Al-Sn [Japanese Patent Provisional Publication No. 63(1988)-67421, Al-In, Al-Cd [Japanese Patent Provisional Publication No. 1(1989)-144573), and burned carbonaceous materials in which lithium ion can be intercalated and deintercalated (Japanese Patent Provisional Publication Nos. 58(1983)-209864, 61(1986)-214417, 62(1987)-88269, 62(1987)-216170, 63(1988)-13282, 63(1988)-24555, 63(1988)-121247, 63(1988)-121257, 63(1988)-155568, 63(1988)-276873, 63(1988)-314821, 1(1989)-204361, 1(1989)-221859 and 1(1989)-274360).

The above lithium metal or lithium alloy is used for inserting lithium ions into a battery and is not used for dissolving or depositing lithium metal.

Binders, electrically conductive agents, and/or filers may be added to a mixture for electrode (anode or cathode).

Examples of the electrically conductive agents include natural graphite (e.g., flaky graphite, flake graphite and amorphous graphite), artificial graphite, acetylene black, furnace black, ketjen black, carbon fiber, metal powder (e.g., Cu, Ni, Al or Ag (Japanese Patent Provisional Publication No. 63(1988)-148554)), metal fiber and polyphenylene derivatives (Japanese Patent Provisional Publication No. 59(1984)-20971). The agents may be used singly or in combination. The graphite and acetylene black are preferably used in combination. The amount of the agent preferably is in the range of 1 to 50 weight %, and more preferably is in the range of 2 to 30 weight %. In use of carbon black or graphite, the amount preferably is in the range of 2 to 15 weight %.

Examples of binders include natural polysaccharide, synthesized polysaccharide, thermoplastic polymers and polymers having rubber elasticity. Preferred examples include starch, polyvinyl alcohol, carboxymethyl cellulose, diacetyl cellulose, hydroxylpropyl cellulose, regenerated cellulose, polyvinyl chloride, polyvinylpyrrolidone, polytetrafluoroethylene, polyfluorovinylidene, polyethylene, polypropylene, ethylene-propylene-diene copolymer (EPDM), sulfonated EPDM, styrene-butadiene rubber, polybutadiene, fluororubber and polyethylene oxide. The polymers may be used singly or in combination. If a polymer such as polysaccharide having a functional group that reacts with lithium is employed, it is preferred that the functional group is inactivated by reacting the group with a compound such as isocyanate compound. The amount of the polymer preferably is in the range of 1 to 50 weight %, and more preferably is in the range of 2 to 30 weight %.

Examples of the filers employable for the invention include fibers of olefin polymers such as polypropylene and polyethylene, glass and carbon. The amount of the filer preferably is in the range of 0 to 30 weight %.

A separator provided between the anode and the cathode is an insulated film having both high ion permeability and desired mechanical strength. A generally used separator is a porous sheet or non-woven fabric made of olefinic polymers such as polypropylene, or a sheet of glass fiber or polyethylene, because they have hydrophobic property and resistance of organic solvent. The diameter of the aperture of the separator generally is in the range of 0.01 to 10 μm. The thickness of the separator generally is in the range of 5 to 300 μm.

The other compounds may be added into the electrolyte in order to improve discharge characteristics and characteristics in charge-discharge cycle. Examples of the compounds include pyridine (Japanese Patent Provisional Publication No. 49(1974)-108525), triethylphosphite (Japanese Patent Provisional Publication No. 47(1972)-4376), triethanolamine (Japanese Patent Provisional Publication No. 52(1977)-72425), cyclic ethers (Japanese Patent Provisional Publication No. 57(1982)-152684), ethylene diamine (Japanese Patent Provisional Publication No. 58(1983)-87777), n-glyme (Japanese Patent Provisional Publication No. 58(1983)-87778), hexaphosphoric acid triamide (Japanese Patent Provisional Publication No. 58(1983)-87779), nitrobenzene derivatives (Japanese Patent Provisional Publication No. 58(1983)-214281), sulfur (Japanese Patent Provisional Publication No. 59(1984)-8280), quinoneimine dye (Japanese Patent Provisional Publication No. 59(1984)-68184), N-substituted oxazolidinone and N,N'-substituted imidazolidinone (Japanese Patent Provisional Publication No. 59(1984)-154778), ethylene glycol dialkyl ether (Japanese Patent Provisional Publication No. 59(1984)-205167), quaternary ammonium salts (Japanese Patent Provisional Publication No. 60(1985)-30065), polyethylene glycol (Japanese Patent Provisional Publication No. 60(1985)-41773), pyrrole (Japanese Patent Provisional Publication No. 60(1985)-79677), 2-methoxyethanol (Japanese Patent Provisional Publication No. 60(1985)-89075), $AlCl_3$ (Japanese Patent Provisional Publication No. 61(1986)-88466), monomer of the conductive polymer used as the active material (Japanese Patent Provisional Publication No. 61(1986)-161673), triethylenephosphoramide (Japanese Patent Provisional Publication No. 61(1986)-208758), trialkylphophine (Japanese Patent Provisional Publication No. 62(1987)-80976), morpholine (Japanese Patent Provisional Publication No. 62(1987)-80977), aryl compounds having carbonyl group (Japanese Patent Provisional Publication No. 62(1987)-86673), crown ethers such as 12-crown-4 (*Physical Review B*, vol. 42(1990) pp. 6424), hexamethylphosphoric triamide and 4-alkylmorpholine (Japanese Patent Provisional Publication No. 62(1987)-217575), bicyclic tertiary amine (Japanese Patent Provisional Publication No. 62(1987)-217578), oils (Japanese Patent Provisional Publication No. 62(1987)-287580), quaternary phosphonium salts (Japanese Patent Provisional Publication No. 63(1988)-121268) and tertiary sulfonium salts (Japanese Patent Provisional Publication No. 63(1988)-121269).

In order to render the electrolytic solution noncombustible, halogen-containing solvents such as carbon tetrachloride and ethylene chloride trifluoride may be added (Japanese Patent Provisional Publication No. 48(1972)-36632). Further, carbon dioxide may be contained in the electrolytic solution so as to give improved preservability at high temperatures (Japanese Patent Provisional Publication No. 59(1984)-134567).

The mixture for the cathode or anode may contain an electrolytic solution or an electrolyte. Examples of the materials of the electrolytic solution or electrolyte include the above-mentioned ion conductive polymers and nitromethane (Japanese Patent Provisional Publication No. 48(1973)-36633, or electrolytic solutions (Japanese Patent Provisional Publication No. 57(1982)-124870).

Otherwise, the surface of the cathode active material may be modified. For example, the surface of the metal oxide can be treated with an agent for esterification (Japanese Patent Provisional Publication No. 55(1980)-163779), a chelating agent (Japanese Patent Provisional Publication No. 55(1980)-163780), conductive polymers (Japanese Patent Provisional Publication Nos. 58(1983)-163188 and 59(1984)-14274), or polyethylene oxide (Japanese Patent Provisional Publication No. 60(1985)-97561).

Further, the surface of the anode active material may be modified. For example, a layer of ion conductive polymer or a layer of polyacetylene may be provided on the surface (Japanese Patent Provisional Publication No. 58(1983)-111276), or the surface may be treated with LiCl (Japanese Patent Provisional Publication No. 58(1983)-142771) or with ethylene carbonate (Japanese Patent Provisional Publication No. 59(1984)-31573).

As a collector, any electronic conductors can be employed unless they induce chemical reaction in the prepared battery. Examples of materials employable for the collector for the cathode generally include stainless steel, titanium, aluminium, nickel and burned carbon, and stainless steel or aluminium plated with carbon, nickel, titanium or silver thereon. Examples of materials employable for the collector for the anode generally include stainless steel, titanium, copper, aluminium, nickel and burned carbon, and stainless steel or aluminium treated with carbon, nickel, titanium or silver thereon as well as Al-Cd alloy. These surface may be oxidized. The shape of the collector include foil, film, sheet, net, punched material, lath, porous film, foam or fiber molded product. The thickness of the collector generally is in the range of 1 to 500 μm.

A method for preparation of the mixture for the anode or cathode is, for example, carried out by mixing an anode or cathode active material, electric conductor and binder (which are in the form of powder) in dry process, or in wet process in which water or an organic solvent is further added to them. Otherwise, the binder employed in the wet process may be converted into its solution or its dispersion (e.g., latex).

Examples of mixing machines preferably employable for the preparation include mortar, mixer, homogenizer, dissolver, sand mill, paint shaker, kneader and dynomill.

The above-mentioned materials can be employed for a battery of any shape such as coin-type, button-type, sheet-type, cylindrical type or square type.

In a battery of coin-type or button-type, a mixture for anode or cathode generally is compressed to form a pellet. The thickness or diameter of the pellet is determined depending upon size of battery. In a battery of sheet-type, cylindrical type or square type, a mixture for anode or cathode active material generally is coated on the collector, dried and compressed. As the coating method, there can be generally employed reverse roller coating, direct roller coating, blade coating, knife coating, extrusion coating, curtain coating, gravure coating, bar coating, dip coating and squeeze coating. Preferred are blade coating, knife coating and extrusion coating. The coating is preferably carried out at a rate of 0.1 to 100 m/min. By selecting a coating method suitable for properties (with respect to solution and drying) of the mixture for anode or cathode from the above coating methods, a coated layer having uniform surface can be formed. The thickness, length and width of the coated layer are generally determined depending on a size of a battery. The thickness of the coated layer, which is compressed after drying, preferably is in the range of 1 to 2,000 μm.

As methods of drying or dehydration of the pellet or sheet, there can be employed known methods. Preferred methods include those using hot air, vacuum, infrared rays, far-infrared rays, electron beam and dry air. These methods may be employed singly or in combination. Temperature for the drying or dehydration preferably is in the range of 80° to 350° C., and more preferably in the range of 100° to 250° C. The moisture content of a battery having the pellet or sheet is not more than 2,000 ppm based on the total weight of the battery. Further, each of the mixture for anode, the mixture of cathode and the electrolyte preferably has moisture content of not more than 500 ppm in terms of cycle characteristics.

As the pressing methods of the pellet or sheet, there can be employed known methods. Preferred are a mold press method and a calendering method. Pressure for pressing preferably is in the range of 0.2 to 3 t/cm$^2$. Pressing rate of the calendering method preferably is in the range of 0.1 to 50 m/min and pressing temperature preferably is in the range of room temperature to 200° C.

The sheet of the mixture is rolled or bent to be inserted into a can and electrically joined to the can. Subsequently, an electrolytic solution is injected into the can, and then the can is sealed up with a plate for seal to prepare a battery of a can. In the battery, a safety valve may be substituted for the plate for seal. The battery may be provided with known various safety elements other than the safety valve. For example, there can be mentioned elements for preventing overcurrent such as fuze, bimetal and PTC (positive temperature coefficient) element. Further, in order to depress increase of pressure in the can, a method of partially cutting the can, an undercut gasket method or a method of undercutting a plate for seal may be employed. Furthermore, a charger for charging may have a circuit which can prevent overcharge or overdischarge.

Insertion of the electrolytic solution may be carried out in one step. However, the insertion is preferably made in two or more steps. In insertion by two or more steps, electrolytic solutions to be inserted in each step may have the same composition or a different composition from each other. For example, after a nonaqueous solvent or an electrolytic solution prepared by dissolving lithium salt in a nonaqueous solvent is inserted, a nonaqueous solvent or an electrolytic solution which has viscosity higher than that of the initial solvent or solution. Further, to shorten time for insertion, the insertion may be performed with reducing pressure within a can (preferably 500 to 1 torr, more preferably 400 to 10 torr), or with imparting supersonic wave or centrifugal force to the can.

As materials for a can or a lead plate, there can be mentioned metals and alloys which have electric conductive property. Examples of the materials include metals such as iron, nickel, titanium, chromium, molybdenum, copper and aluminium, and alloys thereof. A cap (for joining), a can, sheet and a lead plate are welded each other according to known molding methods (e.g., electric weld of D.C. or A.C., laser weld and ultrasonic weld). As seal agents used for the plate for seal, there can be mentioned known compounds or mixtures such as asphalt.

The nonaqueous secondary battery of the invention can be utilized in various uses, for example, note-sized personal computers for color or white-and-black, personal computer capable of inputting with pen, pocket-sized personal computer, note-sized word-processor, pocket-sized word-processor, portable CD player, portable telephone, telephone having no cord, paging equipment, compact terminal equipment, portable facsimile, portable copying machine, portable printer, pocket-sized stereo for headphones, video camera, liquid crystal display, compact cleaner, electric shaver, telephone for car, transceiver for electric power of a small capacity, electric tool, electronic calculator, card-shaped memory, watch, camera and hearing aid.

The following examples further illustrate the present invention, but these examples by no means restrict the invention.

EXAMPLE 1

A mixture for cathode was prepared by mixing (a) $LiCoO_2$ (prepared by burning lithium carbonate and cobalt carbonate in air at 900° C. for 6 hours) as the cathode active material (82 wt. %), flake graphite as conductive agent (12 wt. %) and polytetrafluoroethylene as binder (6 wt. %). The obtained mixture was molded under compression to prepare a cathode pellet (diameter:13 mm, 0.35 g). The pellet was sufficiently dehydrated using a heater of far-infrared rays in a dryer box (dew point of −40° to 70° C., dried air). The resultant pellet was used as a cathode material.

Independently, a mixture for anode was prepared by mixing (A) $LiCoVO_4$ (prepared by burning lithium carbonate, cobalt carbonate and ammonium metavanadate in air at 750° C. for 12 hours) as the precursor for the anode active material (82 wt. %), flake graphite as conductive agent (12 wt. %), and polyfluorovinylidene as binder (6 wt. %). The obtained mixture was molded under compression to prepare an anode pellet (diameter:13 mm, 0.060 g). The pellet was sufficiently dehydrated in the above dryer box. The resultant pellet was used as a anode material.

As the collector, a net of stainless steel (SUS316) having thickness of 80 μm was used. Each net for anode and cathode was welded to a coin can.

As the electrolytic solution, 1 mol/L electrolytic solution shown in Table 1 (e.g., electrolytic solution of Sample 1 was prepared by dissolving $LiPF_6$ in a solvent which was prepared by mixing of 35 volume parts of ethylene carbonate and 65 volume parts of diethyl carbonate) was used in the amount of 250 μL. A porous sheet of polypropylene and non-woven fabric of polypropylene were used as separators. The non-woven fabric was soaked with the electrolytic solution.

TABLE 1

| Electrolytic Solution No. | Composition of Mixed Solvent | Volume Ratio | Lithium Salt (1M) |
|---|---|---|---|
| 1 | EC/DEC | 35/65 | $LiPF_6$ |
| 2 | EC/BC/DEC | 20/20/60 | $LiPF_6$ |
| 3 | EC/γ-BL/DEC | 30/20/50 | $LiPF_6$ |
| 4 | EC/DMC/DEC | 30/35/35 | $LiPF_6$ |
| 5 | EC/BC/DMC/DEC | 20/20/30/30 | $LiPF_6$ |
| 6 | EC/EMC | 35/65 | $LiPF_6$ |
| 7 | EC/DME | 35/65 | $LiPF_6$ |
| 8 | EC/THF | 35/65 | $LiPF_6$ |
| 9 | EC/BC/DME | 20/20/60 | $LiPF_6$ |
| 10 | EC/BC/THF | 20/20/60 | $LiPF_6$ |
| 11 | EC/BC/DEC/DME | 20/20/30/30 | $LiPF_6$ |

TABLE 1-continued

| Electrolytic Solution No. | Composition of Mixed Solvent | Volume Ratio | Lithium Salt (1M) |
|---|---|---|---|
| 12 | EC/DEC | 45/55 | $LiBF_4$ |
| 13 | EC/DEC | 45/55 | $LiCF_3SO_3$ |
| 14 | EC/DEC | 45/55 | $LiPF_6$ |
| 15 | EC/BC/DEC | 25/15/65 | $LiBF_4$ |

Note;
EC: ethylene carbonate
BC: 1,2-butylene carbonate
DEC: diethyl carbonate
DMC: dimethyl carbonate
EMC: ethyl methyl carbonate
γ-BL: γ-butyrolactone
DME: dimethoxyethane
THF: tetrahydrofuran A secondary battery of coin-type shown in FIG. 1 was produced using the resultant elements in the above dryer box.

In FIG. 1, the anode pellet 2 is sealed between the anode seal 1 and the separator 3, the cathode seal 1 is sealed between the cathode case 6 having the collector 5 and the separator 3, and the gasket 7 is provided between the outer periphery of the anode seal 1 and that of the gasket 7.

Samples of Example 1 were evaluated in the following manner:

The charging-discharging test was carried out by iteratively charging and discharging at current density of 0.75 mA/cm² in the range of from 3.9 to 1.8 V, at 22° C. and −10° C. The test started from charging. In more detail, the initial charging changed the precursor of an anode active material into its anode active material.

In the test, (i) discharging capacity at the second cycle (mAh per precursor for anode active material of 1 g), (ii) mean discharging voltage at the second cycle (V), (iii) the number of cycles when discharging capacity reaches 60% of the maximum capacity ((i) to (iii) being measured at 22° C.), and (iv) discharging capacity at the second cycle (mAh per precursor for anode active material of 1 g ) at −10° C., were measured.

The results are set forth in Table 2.

TABLE 2

| Sample No. | *E.S. No. | (i) Capacity 2nd cycl (mAh) | (ii) Mean Voltage (V) | (iii) Number of Cycles | (iv) Capacity 2nd cycle at −10° C. (mAh) |
|---|---|---|---|---|---|
| 1 | 1 | 350 | 2.8 | 38 | 250 |
| 2 | 2 | 360 | 2.9 | 40 | 260 |
| 3 | 3 | 320 | 2.7 | 31 | 240 |
| 4 | 4 | 340 | 2.8 | 35 | 250 |
| 5 | 5 | 370 | 2.8 | 37 | 250 |
| 6 | 6 | 380 | 2.7 | 36 | 260 |
| 7 | 7 | 340 | 2.7 | 32 | 240 |
| 8 | 8 | 320 | 2.8 | 33 | 205 |
| 9 | 9 | 330 | 2.7 | 35 | 200 |
| 10 | 10 | 320 | 2.8 | 34 | 210 |
| 11 | 11 | 370 | 2.7 | 36 | 250 |
| 12 | 12 | 300 | 2.6 | 30 | 180 |
| 13 | 13 | 310 | 2.6 | 31 | 190 |
| 14 | 14 | 340 | 2.7 | 36 | 200 |
| 15 | 15 | 330 | 2.6 | 33 | 230 |

*"E.S. No." means "Electrolytic Solution No." of Table 1.

EXAMPLE 2

The procedures of Example 1 were repeated except for employing (b) $LiCo_{0.95}V_{0.05}O_{2.0}$ (prepared by burning lithium carbonate, cobalt carbonate and ammonium metavanadate in air at 900° C. for 6 hours) instead of (a) $LiCoO_2$ as a cathode active material and employing electrolytic solutions shown in Table 3 to produce secondary batteries.

With respect to each of the obtained batteries, the same test as described in Example 1 was carried out. The results are set forth in Table 3.

TABLE 3

| Sample No. | *E.S. No. | (i) Capacity 2nd cycl (mAh) | (ii) Mean Voltage (V) | (iii) Number of Cycles | (iv) Capacity 2nd cycle at −10° C. (mAh) |
|---|---|---|---|---|---|
| 16 | 2  | 370 | 2.9 | 41 | 260 |
| 17 | 4  | 350 | 2.8 | 34 | 250 |
| 18 | 14 | 340 | 2.8 | 36 | 200 |

*"E.S. No." means "Electrolytic Solution No." of Table 1.

EXAMPLE 3

The procedures of Example 1 were repeated except for employing (B) $Li_{1.0}Co_{0.5}V_{0.5}O_{2.0}$ instead of (A) $LiCoVO_4$ as a precursor for an anode active material and employing electrolytic solutions shown in Table 4 to produce secondary batteries. The $Li_{1.0}Co_{0.5}V_{0.5}O_{2.0}$ was prepared by burning lithium carbonate, cobalt carbonate and ammonium metavanadate in air at 900° C. for 6 hours. With respect to each of the obtained batteries, the same test as described in Example 1 was carried out. The results are set forth in Table 4.

TABLE 4

| Sample No. | *E.S. No. | (i) Capacity 2nd cycl (mAh) | (ii) Mean Voltage (V) | (iii) Number of Cycles | (iv) Capacity 2nd cycle at −10° C. (mAh) |
|---|---|---|---|---|---|
| 19 | 1  | 340 | 2.8 | 36 | 230 |
| 20 | 5  | 350 | 2.8 | 35 | 220 |
| 21 | 11 | 340 | 2.7 | 34 | 230 |

*"E.S. No." means "Electrolytic Solution No." of Table 1.

EXAMPLE 4

The procedures of Example 1 were repeated except for employing (C) $WO_2$ of rutile structure instead of (A) $LiCoVO_4$ as a precursor for an anode active material and employing electrolytic solutions shown in Table 5 to produce secondary batteries.

With respect to each of the obtained batteries, the same test as described in Example 1 was carried out.

The results are set forth in Table 5.

TABLE 5

| Sample No. | *E.S. No. | (i) Capacity 2nd cycl (mAh) | (ii) Mean Voltage (V) | (iii) Number of Cycles | (iv) Capacity 2nd cycle at −10° C. (mAh) |
|---|---|---|---|---|---|
| 22 | 3  | 150 | 2.4 | 23 | 110 |
| 23 | 7  | 130 | 2.3 | 22 | 90  |
| 24 | 15 | 160 | 2.5 | 25 | 110 |

*"E.S. No." means "Electrolytic Solution No." of Table 1.

COMPARISON EXAMPLE 1

The procedures of Example 1 were repeated except for employing electrolytic solutions shown in Table 6 to produce secondary batteries.

TABLE 6

| Electrolytic Solution No. | Composition of Mixed Solvent | Volume Ratio | Lithium Salt (1M) |
|---|---|---|---|
| 16 | PC/DME     | 50/50 | $LiBF_4$ |
| 17 | EC/AN      | 50/50 | $LiBF_4$ |
| 18 | EC/DMFA    | 50/50 | $LiBF_4$ |
| 19 | PC/DMC/DME | 1/1/1 | $LiBF_4$ |

Note;
PC: propylene carbonate
AN: acetonitrile
DMFA: dimethylformamide

With respect to each of the obtained batteries, the same test as described in Example 1 was carried out.

The results are set forth in Table 7.

TABLE 7

| Sample No. | *E.S. No. | (i) Capacity 2nd cycl (mAh) | (ii) Mean Voltage (V) | (iii) Number of Cycles | (iv) Capacity 2nd cycle at −10° C. (mAh) |
|---|---|---|---|---|---|
| 25 | 16 | 180 | 2.6 | 18 | 130 |
| 26 | 17 | 150 | 2.4 | 12 | 115 |
| 27 | 18 | 120 | 2.2 | 10 | 80  |
| 28 | 19 | 195 | 2.5 | 19 | 140 |

As is apparent from results of Examples 1 to 4 and Comparison Example 1, the batteries using the anode active material of the invention show high discharging voltage, high discharge capacity and a long life in charge-discharge cycle as well as high discharge capacity at a low temperature.

Further, the density of the pellet of the anode active material of the invention is in the range of 2.5 to 3.5 (g/cm³) and therefore is about 2 to 3 times as large as that of burned carbonaceous material (1.1 to 1.4 (g/cm³)). Further, it is apparent that discharge capacity per volume of the anode active material of the invention is 2 to 3 times as large as that of burnt carbonaceous material.

Subsequently, the obtained battery was evaluated by X-ray diffractograms.

Figure 2:
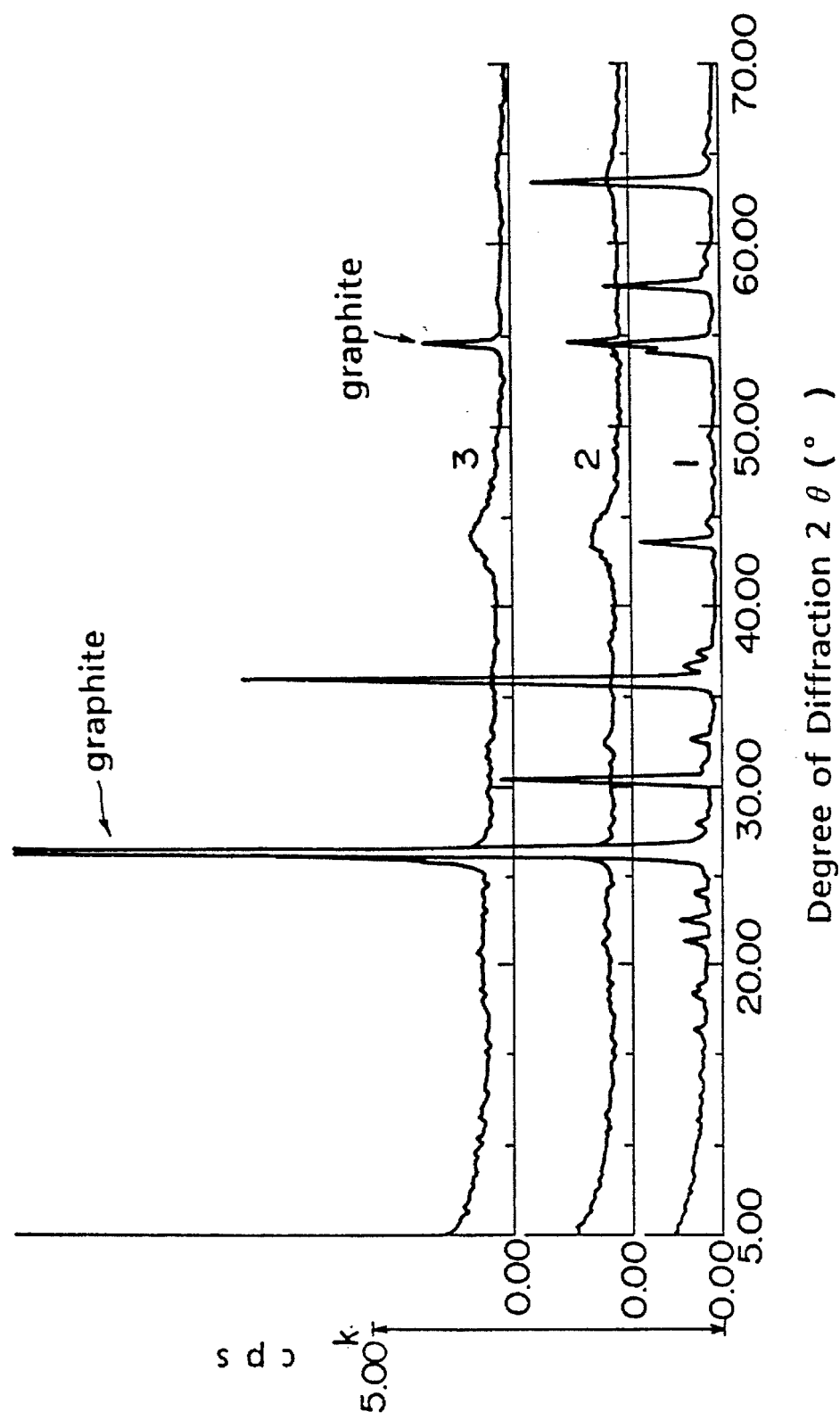
FIG. 2 shows X-ray diffractograms of the anode active material (prior to charging (prior to insertion of lithium), after one charge-discharge cycle and after 10 charge-discharge cycles) used for Sample 14 of Example 1.

(1) X-ray diffractograms of the precursor for the anode active material, the anode active material of Sample of Example 1 (at 1.8 V) that the precursor underwent 1 cycle of charging-discharging and the anode active material (at 1.8 V) that the precursor underwent 10 cycles of charging-discharging, were measured. The obtained X-ray diffractograms are shown in FIG. 2. The X-ray diffractogram of the precursor of the anode active material is designated by "1" of FIG. 2, that of the anode active material after 1 cycle is designated by "2" and that of the anode active material after 10 cycles is designated by "3".

The X-ray diffractograms (FIG. 2) of the precursor for the anode active material and the anode active material of Sample 14 of Example 1 show that the X-ray diffractogram is changed (in location or height of peak) by insertion of lithium ions (charging) but is not changed during repetition of charging and discharging.

Further, obtained batteries were evaluated as to safety.

(1) The battery of Sample 2 of Example 1 was evaluated by the following safety test.

Fifty of the batteries were subjected to 20 cycles of charging and discharging (5 mA/cm$^2$). Subsequently, the anode pellets were taken out from the batteries in air of 60% RH, and the pellets were observed as to whether spontaneous ignition took place or not.

(2) The following batteries (Comparison Example 2) were evaluated in the same manner as above (1).

COMPARISON EXAMPLE 2

The procedures of Example 1 were repeated except for using Li-Al alloy (Li/Al=80/20, by weight, diameter: 15 mm, weight: 1.0 g) as the anode active material to produce secondary batteries of coin-type.

All the batteries of Sample 2 did not ignite, but thirty of batteries obtained in Comparison Example 2 ignited. Hence, it is apparent that the battery of the invention has high safety.

EXAMPLE 5

Cathode Active Material (The number of oxygen atoms in the following formula is determined by the aforementioned simple method)
(a) $LiCoO_2$ employed in Example 1.
(b) $LiCo_{0.95}V_{0.05}O_{2.0}$ employed in Example 2

Anode Active Material (The number of oxygen atoms in the following formula is determined by the aforementioned simple method)
(B) $Li_{1.0}Co_{0.5}V_{0.5}O_{2.0}$ employed in Example 3
(D) $Li_{0.5}Co_{0.5}V_{0.5}O_2$ (prepared by burning lithium carbonate, cobalt carbonate and vanadium pentaoxide in air at 1,000° C. for 24 hours)
(E) CoO
(F) $Li_{1.2}V_2O_5$ prepared by electrically chemical method Each of the above compounds "a", "b", "B" and "D" to "E" was confirmed to be a crystalline compound by means of X-ray diffraction.

was prepared by mixing each of the synthesized anode active materials indicated in Table 10 (82 wt. %), graphite flakes as conductor (12 wt. %) and polyfluorovinylidene as binder (6 wt. %). The obtained mixture was dried and molded to prepare an anode pellet (diameter:15 mm, 0.32 g). A porous sheet of polypropylene and non-woven fabric of polypropylene are used as the separator. The non-woven fabric was soaked with each of the electrolytic solutions.

In the above-described manner, a lithium battery of coin-type shown in FIG. 1 was prepared.

Samples (batteries) of Example 5 were evaluated in the following manner:

Test 1

With respect to the prepared lithium battery, charging-discharging test was carried out (current density: 1 mA/cm$^2$, charging-discharging depth: 5 mAH). Thus, discharging voltage and the number of cycles when discharging capacity reaches 60% of the maximum capacity were measured.

Test 2

With respect to the prepared lithium battery, charging-discharging test was carried out (current density: 1 mA/cm$^2$, charging-discharging depth: 100% (3.6–1.8 V)), and the discharging capacity at the 10th cycle was measured

Comparison Examples 3

Using each of (A') $TiS_2$ and (B') $LiTiS_2$ as the anode active material, anode pellets was prepared in the same manner as described in Example 5 and a secondary battery of coin-type was prepared in the same manner as described in Example 5. The battery was subjected to charge-discharge test in the same manner as described in Example 5.

Comparison Example 4

A secondary battery of coin-type was prepared in the same manner as described in Example 5 except for using each of the electrolytic solutions shown in Table 9.

TABLE 8

| Electrolytic Solution No. | (Electrolytic solution) | | Lithium Salt (1M) |
|---|---|---|---|
| | Composition of Mixed Solvent | Volume Ratio | |
| 20 | EC/DEC/DME | 40/20/40 | $LiBF_4$ |
| 21 | EC/DEC/THF | 1/1/1 | $LiBF_4$ |
| 22 | EC/BC/DME | 40/20/40 | $LiBF_4$ |
| 23 | EC/γ-BL/DME | 40/20/40 | $LiBF_4$ |
| 24 | EC/DEC/BC/DME | 25/25/25/25 | $LiBF_4$ |
| 25 | EC/γ-BL/DME | 40/40/20 | $LiPF_6$ |
| 26 | EC/DEC/DME | 40/20/40 | $LiPF_6$ |
| 27 | EC/DEC/BC/DME/THF | 3/1/1/1/1 | $LiPF_6$ |
| 28 | EC/DEC/DME | 40/20/40 | $LiCF_3SO_3$ |
| 29 | EC/DEC | 50/50 | $LiBF_4$ |
| 30 | EC/DEC/BC | 40/40/20 | $LiBF_4$ |
| 31 | EC/DME/THF | 50/25/25 | $LiBF_4$ |

Batteries were prepared using the above materials the following manner. In the following preparation of the batteries, combinations of the cathode active material, the anode active material and the electrolytic solution were indicated in Table 10.

A mixture for cathode was prepared by mixing each of the synthesized cathode active materials indicated in Table 10 (84 wt. %), acetylene black as conductor (10 wt. %) and tetrafluoroethylene as binder (6 wt. %). The obtained mixture was dried and molded to prepare a cathode pellet (diameter:15 mm, 0.7 g). Independently, a mixture for anode

TABLE 9

| Electrolytic Solution No. | (Electrolytic solution) | | Lithium Salt (1M) |
|---|---|---|---|
| | Composition of Mixed Solvent | Volume Ratio | |
| 32 | PC/DME | 50/50 | $LiBF_4$ |
| 33 | EC/MA | 50/50 | $LiBF_4$ |
| 34 | EC/DMF | 50/50 | $LiBF_4$ |
| 35 | PC/DEC/DME | 1/1/1 | $LiBF_4$ |

TABLE 10

| No. | Active Material | | Electrolytic Solution | Test 1 | | Test 2 |
|---|---|---|---|---|---|---|
| | Cathode | Anode | | Voltage (V) | Cycle (times) | Capacity (mAh) |
| Example 5 | | | | | | |
| 29 | a | B | 20 | 2.6 | 99 | 36 |
| 30 | a | B | 21 | 2.5 | 94 | 39 |
| 31 | a | B | 22 | 2.7 | 95 | 40 |
| 32 | a | B | 25 | 2.7 | 87 | 39 |
| 33 | a | B | 28 | 2.6 | 101 | 30 |
| 34 | a | D | 20 | 2.6 | 99 | 46 |
| 35 | a | D | 23 | 2.7 | 88 | 42 |
| 36 | a | D | 24 | 2.8 | 93 | 45 |

TABLE 10-continued

|  | Active Material | | Electrolytic Solution | Test 1 | | Test 2 |
|---|---|---|---|---|---|---|
| | | | | Voltage | Cycle | Capacity |
| No. | Cathode | Anode | | (V) | (times) | (mAh) |
| 37 | a | D | 25 | 2.7 | 85 | 42 |
| 38 | a | D | 26 | 2.7 | 95 | 40 |
| 39 | a | E | 20 | 1.6 | 55 | 35 |
| 40 | a | F | 20 | 1.9 | 50 | 22 |
| 41 | a | F | 24 | 2.0 | 51 | 26 |
| 42 | b | B | 22 | 2.6 | 98 | 35 |
| 43 | b | B | 23 | 2.7 | 89 | 38 |
| 44 | b | B | 24 | 2.8 | 100 | 32 |
| 45 | b | B | 25 | 2.8 | 86 | 40 |
| 46 | b | D | 20 | 2.7 | 101 | 40 |
| 47 | b | D | 21 | 2.6 | 94 | 42 |
| 48 | b | D | 22 | 2.8 | 95 | 41 |
| 49 | b | D | 23 | 2.7 | 90 | 39 |
| 50 | b | D | 24 | 2.7 | 95 | 45 |
| 51 | b | D | 25 | 2.9 | 88 | 38 |
| 52 | b | D | 26 | 2.8 | 99 | 40 |
| 53 | b | D | 28 | 2.6 | 96 | 38 |
| 54 | b | D | 30 | 2.9 | 92 | 38 |
| 55 | b | E | 23 | 2.3 | 63 | 33 |
| 56 | b | F | 22 | 2.0 | 52 | 28 |
| 57 | b | F | 25 | 1.9 | 56 | 22 |
| Com. Ex. 3 | | | | | | |
| 58 | a | A' | 20 | 1.5 | 20 | 25 |
| 59 | a | A' | 21 | 1.8 | 13 | 20 |
| 60 | a | B' | 20 | 2.1 | 11 | 12 |
| 61 | a | B' | 24 | 2.1 | 9 | 10 |
| 62 | b | A' | 23 | 1.6 | 18 | 23 |
| 63 | b | A' | 27 | 1.8 | 17 | 22 |
| 64 | b | B' | 22 | 2.0 | 12 | 11 |
| 65 | b | B' | 30 | 1.9 | 11 | 9 |
| Com. Ex. 4 | | | | | | |
| 66 | a | B | 32 | 2.6 | 50 | 34 |
| 67 | a | B | 33 | 2.7 | 37 | 22 |
| 68 | a | E | 32 | 1.5 | 23 | 23 |
| 69 | a | E | 35 | 1.4 | 24 | 20 |
| 70 | b | B | 32 | 2.8 | 49 | 37 |
| 71 | b | B | 33 | 2.6 | 32 | 23 |
| 72 | b | D | 32 | 2.7 | 50 | 35 |
| 73 | b | D | 33 | 2.7 | 36 | 26 |
| 74 | b | D | 34 | 2.6 | 34 | 29 |
| 75 | b | D | 35 | 2.7 | 49 | 33 |

From the results of Example 5 and Comparison Example 3 (using metal compounds other than transition metal oxide), it is apparent that the battery of the invention has high discharge potential and long charging-discharging cycle. From the results of Example 5 and Comparison Example 4 (using electrolytic solutions other than those of the invention), it is apparent that the battery of the invention has high discharge potential and high discharging capacity.

Subsequently, obtained batteries were evaluated as to safety.

(1) The batteries of Samples 31 of Example 5 were evaluated by the following safety test.

Fifty of the batteries of each sample were subjected to 20 cycles of charging and discharging procedures (5 mA/cm$^2$). Subsequently, the anode pellets were taken out of the batteries in air of 60% RH, and the pellets were observed as to whether spontaneous ignition took place or not.

(2) The following batteries (Comparison Example 5) were evaluated in the same manner as above (1).

COMPARISON EXAMPLE 5

The procedures of Samples 31 of Example 5 were repeated except for using Li-Al alloy (Li/Al=80/20, by weight, diameter:15 mm, weight: 1.0 g) as the anode active material to produce secondary batteries of coin-type.

All the batteries of Samples 31 did not ignite. In Comparison Example 5 (combination of (a) or (b) as cathode active material and metal alloy of Li-AL as anode active material), spontaneous ignition occurred in 30 and 33 batteries, respectively. From these results, it was confirmed that the battery of the invention was very safe.

I claim:

1. A nonaqueous secondary battery which comprises a cathode active material, an anode active material and an electrolytic solution;

wherein said anode active material comprises a transition metal oxide, said cathode active material comprises a lithium-containing transition metal oxide represented by $Li_yO_z$ in which M is at least one transition metal selected from the group consisting of Co, Mn, Ni, V and Fe, y is in the range of 0.3 to 1.2, and z is in the range of 1.4 to 3, and said electrolytic solution comprises a fluorine-containing lithium salt in a mixed solvent which comprises ethylene carbonate in an amount of 5 to 40% by volume and at least one selected from the group consisting of diethyl carbonate, ethyl methyl carbonate and dimethoxyethane, the latter being present in an amount of 60 to 95% by volume.

2. The nonaqueous secondary battery as defined in claim 1, wherein said mixed solvent contains ethylene carbonate in an amount of 10 to 35% by volume.

3. The nonaqueous secondary battery as defined in claim 1, wherein said lithium salt is at least one selected from the group consisting of $LiBF_4$, $LiPF_6$ and $LiCF_3SO_3$.

4. The nonaqueous secondary battery as defined in claim 1, wherein said mixed solvent further contains at least one selected from the group consisting of chain carbonic acid esters other than diethyl carbonate and ethyl methyl carbonate, cyclic carbonic acid esters having 5 or more carbon atoms, cyclic esters, chain ethers other than dimethoxyethane and cyclic ethers.

5. A nonaqueous secondary battery as defined in claim 1, wherein said mixed solvent further contains at least one selected from the group consisting of chain carbonic acid esters other than diethyl carbonate and ethyl methyl carbonate, cyclic carbonic acid esters having 5 or more carbon atoms, chain ethers other than dimethoxyethane and cyclic ethers.

6. A nonaqueous secondary battery as defined in claim 1, wherein said mixed solvent further contains at least one selected from the group consisting of butylene carbonate, tetrahydrofuran and γ-butyrolactone.

7. A nonaqueous secondary battery which comprises a cathode active material, an anode active material and an electrolytic solution;

wherein said anode active material comprises a transition metal oxide of which an inherent crystal structure has been changed by insertion of lithium ions and is in a condition that said changed crystal structure is essentially not changed during repeated charging and discharging, and said electrolytic solution comprises a fluorine-containing lithium salt in a mixed solvent which comprises ethylene carbonate and at least one selected from the group consisting of chain carbonic acid esters, cyclic carbonic acid esters having 5 or more carbon atoms, cyclic esters, chain ethers and cyclic ethers.

8. The nonaqueous secondary battery as defined in claim 7, wherein said mixed solvent comprises ethylene carbonate and at least one selected from the group consisting of diethyl carbonate, ethyl methyl carbonate and dimethoxyethane.

9. The nonaqueous secondary battery as defined in claim 7, wherein said mixed solvent comprises ethylene carbonate and at least one selected from the group consisting of chain carbonic acid esters, cyclic carbonic acid esters having five or more carbon atoms, chain ethers and cyclic ethers.

10. The nonaqueous secondary battery as defined in claim 7, wherein said mixed solvent comprises ethylene carbonate and chain carbonic acid esters, or comprises ethylene carbonate, chain carbonic acid esters and at least one selected from the group consisting of cyclic carbonic acid esters having five or more carbon atoms, cyclic esters, chain ethers and cyclic ethers.

11. The nonaqueous secondary battery as defined in claim 10, wherein said mixed solvent contains ethylene carbonate in the amount of 48% by volume or less.

12. The nonaqueous secondary battery as defined in claim 10, wherein said mixed solvent contains ethylene carbonate in the amount of 5 to 45% by volume.

13. The nonaqueous secondary battery as defined in claim 10, wherein said lithium salt is at least one selected from the group consisting of $LiBF_4$, $LiPF_6$ and $LiCF_3SO_3$.

14. The nonaqueous secondary battery as defined in claim 10, wherein said anode active material comprises a lithium-containing transition metal oxide represented by $Li_xMO_j$ wherein M is at least one transition metal selected from the group consisting of Ti, V, Mn, Co, Fe, Ni, Cr, Nb and Mo, x is in the range of 0.17 to 11.25, and j is in the range of 1.6 to 4.1.

15. The nonaqueous secondary battery as defined in claim 10, wherein said cathode active material comprises a lithium-containing transition metal oxide represented by $Li_yMO_z$ in which M is at least one transition metal selected from the group consisting of Co, Mn, Ni, V and Fe, y is in the range of 0.3 to 1.2, and z is in the range of 1.4 to 3.

* * * * *

UNITED STATES PATENT AND TRADEMARK OFFICE
CERTIFICATE OF CORRECTION

PATENT NO. : 5,478,673
DATED : December 26, 1995
INVENTOR(S) : Eiji Funatsu

It is certified that error appears in the above-indentified patent and that said Letters Patent is hereby corrected as shown below:

Column 28, line 20, claim 1, line 7, delete "$Li_yO_z$", insert --$Li_yMO_z$--.

Signed and Sealed this

Twenty-eighth Day of May, 1996

*Attest:*

BRUCE LEHMAN

*Attesting Officer*   *Commissioner of Patents and Trademarks*